United States Patent [19]

Kojima

[11] Patent Number: 5,422,679

[45] Date of Patent: Jun. 6, 1995

[54] VIDEO SIGNAL PROCESSOR FOR REMOVING A SEPARATED SIGNAL COMPONENT FROM AN INPUT VIDEO SIGNAL

[75] Inventor: Masanori Kojima, Nagaokakyo, Japan

[73] Assignee: Mitsubishi Denki Kabushiki Kaisha, Tokyo, Japan

[21] Appl. No.: 181,541

[22] Filed: Jan. 14, 1994

Related U.S. Application Data

[60] Division of Ser. No. 25,807, Mar. 3, 1993, which is a continuation of Ser. No. 605,391, Oct. 30, 1990, abandoned.

[30] Foreign Application Priority Data

Dec. 6, 1989 [JP] Japan .................. 1-318414

[51] Int. Cl.$^6$ .................. H04N 9/77; H04N 9/78
[52] U.S. Cl. .................. 348/664; 548/665
[58] Field of Search ............... 348/607, 622, 624, 664, 348/665, 666; 358/31, 36; H04N 9/77, 9/78

[56] References Cited

U.S. PATENT DOCUMENTS

| 4,050,084 | 9/1977 | Rossi .................. 358/31 |
| 4,916,527 | 4/1990 | Matsuo .................. 358/31 |
| 4,980,737 | 12/1990 | Umezawa .................. 358/31 |
| 5,047,840 | 9/1991 | Miki .................. 348/664 |

FOREIGN PATENT DOCUMENTS

| 3819010A | 2/1988 | Germany . |
| 3930806C | 5/1990 | Germany . |
| 2220587 | 9/1990 | Japan . |
| 410795 | 1/1992 | Japan . |
| 2154093 | 8/1985 | United Kingdom . |
| 2204209 | 11/1988 | United Kingdom . |
| 2209905 | 5/1989 | United Kingdom . |
| 2216745 | 10/1989 | United Kingdom . |
| 2223375 | 4/1990 | United Kingdom . |

Primary Examiner—James J. Groody
Assistant Examiner—Sherrie Hsia

[57] ABSTRACT

A video signal processor is used in connection with a television set or similar apparatus for processing a video signal input for every horizontal line period. A video signal is processed by operations such as comparison and addition of a video signal, a first delay signal which is delayed by a one-horizontal line period and a second delay signal which is delayed by a two-horizontal line period. Since there is a horizontal correlation in a video signal, it is possible to separate a color signal from a luminance signal and remove the noise component from the luminance signal by a predetermined operation. The comparison is substantially the subtraction of the signals which are output one after another by a delay of one horizontal line period in series, thereby avoiding such trouble as color edging.

9 Claims, 19 Drawing Sheets

SPECTRUM DISTRIBUTION OF VIDEO SIGNAL 3.58 MHz IN NTSC

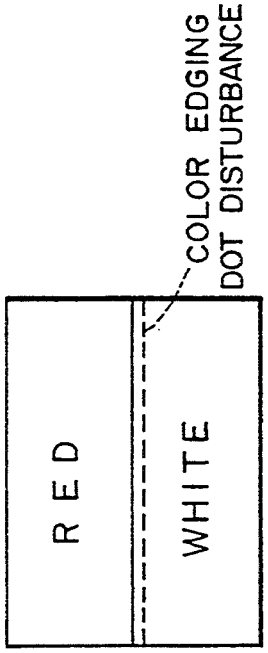
FIG. 20a
PRIOR ART
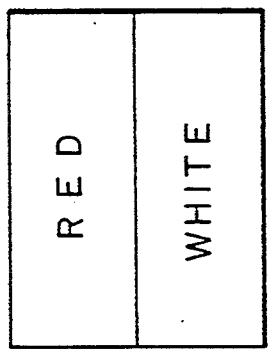
FIG. 20b
PRIOR ART
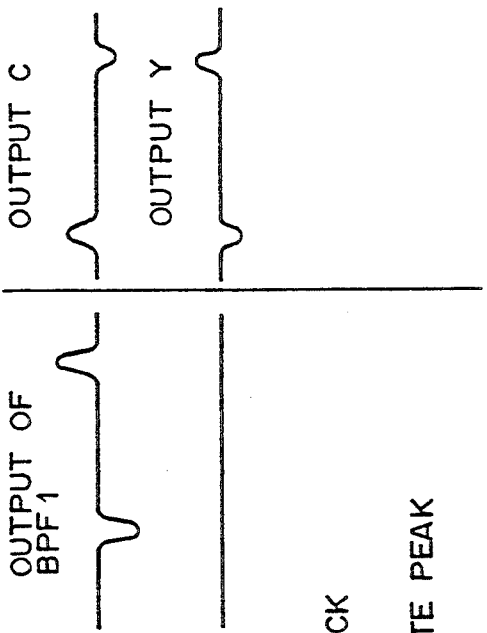
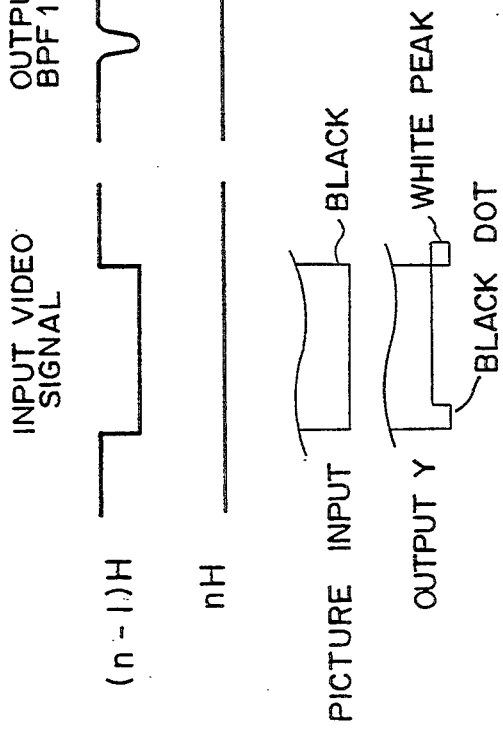
FIG. 21
PRIOR ART

VIDEO SIGNAL PROCESSOR FOR REMOVING A SEPARATED SIGNAL COMPONENT FROM AN INPUT VIDEO SIGNAL

This application is a divisional of application Ser. No. 08/025,807 filed on Mar. 3, 1993, which is a continuation of prior application Ser No. 07/605,391, filed Oct. 30, 1990 now abandoned,

BACKGROUND OF THE INVENTION

1. Field of the Invention

The present invention relates to a video signal processor and, more particularly, to a luminance signal and a color signal separating circuit, and a noise reducing circuit for a video signal.

2. Description of the Related Art

FIG. 15 is a block diagram of the circuit of what is called a comb filter which is generally used for a VTR, a TV set, etc. In the NTSC broadcasting system, a color burst signal and a color signal are inverted before transmission for every horizontal line (about 63.5 μs, hereinunder referred to as "1H"), as shown in FIG. 18. Such a comb filter is utilized as a filter for separating a luminance signal (Y signal) from a color signal (C signal). In a VTR, a comb filter is utilized as a filter for cancelling the crosstalk component in a color signal.

In FIG. 15, the reference numeral 100 represents a video signal. The video signal 100 is input to a band pass filter 1 (hereinunder referred to as "BPF"), for transmitting only a band of frequencies in which the color signal component exists, and a delay circuit 2. The output of the BPF 1 is input to a 1H-delay circuit 3 for delaying a signal by a 1H period, and the output of the 1H-delay circuit 3 is input to a subtractor 4. The subtractor 4 subtracts the output of the 1H-subtractor 3 from the output of the BPF 1. The output of the subtractor 4 is input to a subtractor 6 as a C signal through a gain adjuster 5. The subtractor 6 generates a Y signal by subtracting the output (C signal) of the gain adjuster 5 from the output of the delay circuit 2.

The operation of this comb filter will now be explained. The operations of the 1H-delay circuit 3 and the subtractor 4 will first be explained. Due to the above-described structure of the 1H-delay circuit 3 and the subtractor 4, the transmission function in this part is represented as follows:

$$H(z) = 1 - e^{-z} \quad H(\omega) = 1 - \cos \omega T_H + j \sin \omega T_H (T_H \text{ represents a } 1H) \quad H(f) = 1 - \cos 2\pi f T_h + j \sin 2\pi f T_H$$

Accordingly, $$|H(f)| = \sqrt{(1 - \cos 2\pi f T_H)^2 + (j \sin 2\pi f T_H)^2}$$
$$= \sqrt{2 - 2\cos 2\pi f T_H}$$

From this equation, it is obvious that the frequency characteristic is a function of a repeated reciprocal of $T_H$. More specifically, the frequency characteristic resembles the shape of the teeth of a comb which has the maximum value when $$f = \frac{2n + 1}{2T_H}$$

(n is an integer) and the minimum value when $$f = \frac{n}{T_H}.$$

In multiplexing a luminance signal and a color signal in the NTSC broadcasting system, the frequency-division multiplex system which utilizes frequency interleaving, as shown in FIG. 16, is adopted. Therefore, a color signal spectrum is distributed between every adjacent luminance signal spectra emitted at an interval $$f_h \left( = \frac{1}{T_H} \right).$$

It is therefore possible to extract either the luminance signal spectrum or the color signal spectrum emitted at an interval of $f_h$ by using the above-described comb filter composed of the 1H-delay circuit 3 and the subtractor 4.

The BPF 1 is a filter for transmitting a band of frequencies in which a color signal exists (e.g., 3.58 MH$_z$±500 KH$_z$ in the NTSC system), as shown in FIG. 17. The band of frequencies which are passed through the BPF 1 is set at a frequency band having a frequency characteristic resembling the shape of the teeth of a comb. The delay circuit 2 is a filter for compensating for the propagation delay of the BPF 1, the subtractor 4 and the gain adjuster 5. By the delay circuit 2, the phase of a video signal is adjusted and the gain adjuster 5 adjusts the gain of the color signal C which is extracted in accordance with the frequency characteristic in the shape of the teeth of a comb and output from the subtractor 4. The subtractor 6 removes the color signal C so as to generate the luminance signal Y.

The above-described comb filter, however, deteriorates the vertical resolution because the operation is carried out in the vertical direction of the screen, which leads to the following defects in the picture quality.

For example, video signals for producing a picture shown in FIG. 20(a) are shown in FIG. 18. In FIG. 18, the video signals before and after the video signal for the horizontal line n-th H on which a red color changes to a white color, as shown in FIG. 20(a), are shown. The signals output before the signal for the n-th H transmit a color signal red and the signals for the n-th H and therebelow transmit a color signal white. When these signals are input to the video processing circuit shown in FIG. 15, the video processing circuit outputs the signals such as those shown in FIG. 19. That is, on the n-th H, unnecessary signals are contained in the Y signal and the C signal. When these signals are output on the TV screen, the picture shown in FIG. 20(b) is produced. In other words, a phenomenon called color edging (red sags from the boundary line between red and white to the region of white) is produced on the line on called dot disturbance (a signal of 3.58 MH$_z$ is mixed with a the screen on which the color changes, or a phenomenon luminance signal) is produced.

Such a deterioration in the picture quality is a critical defect in a VTR. This is because color edging is produced not only in the luminance signal and color signal separation in the interior of a VTR but also in the horizontal correlative noise cancellation in the crosstalk canceller in the VTR and in the luminance signal and color signal separation for the VTR output signal carried out again in a TV and, as a result, color edging is produced extending over several H's.

The luminance signal is also deteriorated in vertical resolution, as shown in FIG. 21, which shows the state of the picture in which the black bar is sagging and is cut at the n-th H. The output of the BPF 1 on the (n−1)th H only exists in the transient portions. When a video signal for the n-th H is input, no output of the BPF 1 exists. However, since the 1H-delay circuit 3 supplies the output of the BPF 1, the unnecessary C and Y signals are output. The C signal and Y signal output in spite of the absence of the output of the BPF 1 on the n-th H causes cross color and the deterioration in the vertical resolution, respectively. In the picture displayed on the basis of the Y signal, a black dot and a white peak appear, as shown in FIG. 21, which deteriorate the definition of the picture.

SUMMARY OF THE INVENTION

Accordingly, it is an object of the present invention to eliminate the above-described problems in the related art and to provide a video signal processor which is capable of reducing color edging, dot disturbance, cross color and deterioration in vertical resolution.

To achieve this aim, a video signal processor according to the present invention has a delay circuit for delaying an input video signal by an integral number of times the horizontal line period so as to generate two kinds of delay signals, namely, a first delay signal and a second delay signal. The video signal processor has the following structure so as to compare these three signals.

In the first aspect of the present invention, the video signal processor comprises:
  a maximum value calculator for comparing the video signal, the first delay signal and the second delay signal which are input thereto and outputting the maximum value;
  a minimum value calculator for comparing the video signal, the first delay signal and the second delay signal which are input thereto and outputting the minimum value;
  a synthesizer for outputting a signal obtained by subtracting the outputs of the maximum value calculator and the minimum value calculator from the sum of the video signal, the doubled first delay signal and the second delay signal; and
  a subtractor for subtracting the output of the synthesizer from the first delay signal.

In the second aspect of the present invention, the video signal processor comprises:
  a first synthesizer for compounding the antiphase video signal, the first delay signal and the second delay signal;
  a second synthesizer for compounding the video signal and the second delay signal;
  a third synthesizer for compounding the video signal, the doubled first delay signal and the antiphase second delay signal;
  a maximum value calculator for comparing the output signals of the first, second and third synthesizers which are input thereto and outputting the maximum value;
  a minimum value calculator for comparing the output signals of the first, second and third synthesizers which are input thereto and outputting the minimum value;
  an adder for adding the output of the maximum value calculator and the output of the minimum value calculator; and
  a subtractor for subtracting the output signal of the adder from the first delay signal.

In the third aspect of the present invention, the video signal processor comprises:
  a first adder for adding the video signal and the first delay signal;
  a second adder for adding the doubled first delay signal and the second delay signal;
  an intermediate value calculator for outputting the intermediate value of the doubled first delay signal, the output of the first adder and the output of the second adder which are input thereto; and
  a subtractor for subtracting the output signal of the intermediate value calculator from the first delay signal.

In the first aspect of the present invention, for example, when the video signal for the (n−1)th H is input, the output of the synthesizer corresponds to the color signal at the (n−2)th H, and the color component in the Y component is cancelled by the output C. When the video signal for the (n+1)th H is input, neither the output Y or the output C is contained in the signal for the n-th H, thereby producing neither cross color nor a reduction in vertical resolution.

In the second aspect of the present invention, for example, when the video signal for the (n−1)th H is input, the output of the adder corresponds to the color signal for the (n−2)th H, so that the color component in the Y component is cancelled by the output C. When the video for the (n+1)th H is input, the output of the adder is zero and both the output C and the output Y are zero, thereby producing neither cross color nor lowering in the vertical resolution.

In the third aspect of the present invention, when the video signal for the (n−1)th H is input, the output of the intermediate value calculator corresponds to the color signal for the (n−2)th H, and the color component of the Y component is cancelled by the output C. When the video signal for the (n+1)th H is input, the output of the intermediate value calculator is calculated from the output of the first adder and the output of the second adder and both the output C and the output Y become zero.

In this way, according to the present invention, since a nonlinear filter is used as an operating circuit in a video signal processor, it is possible to greatly reduce the color edging, dot disturbance, cross color and reduction in vertical resolution.

The above and other objects, features and advantages of the present invention will become clear from the following description of the preferred embodiments thereof, taken in conjunction with the accompanying drawings.

BRIEF DESCRIPTION OF THE DRAWINGS

FIG. 20A and 20B show the picture produced by the conventional video signal processor; and FIG. 21 shows the wave form of each portion of the conventional video signal processor with respect to a different video signal input.

DESCRIPTION OF THE PREFERRED EMBODIMENTS

Figure 1:
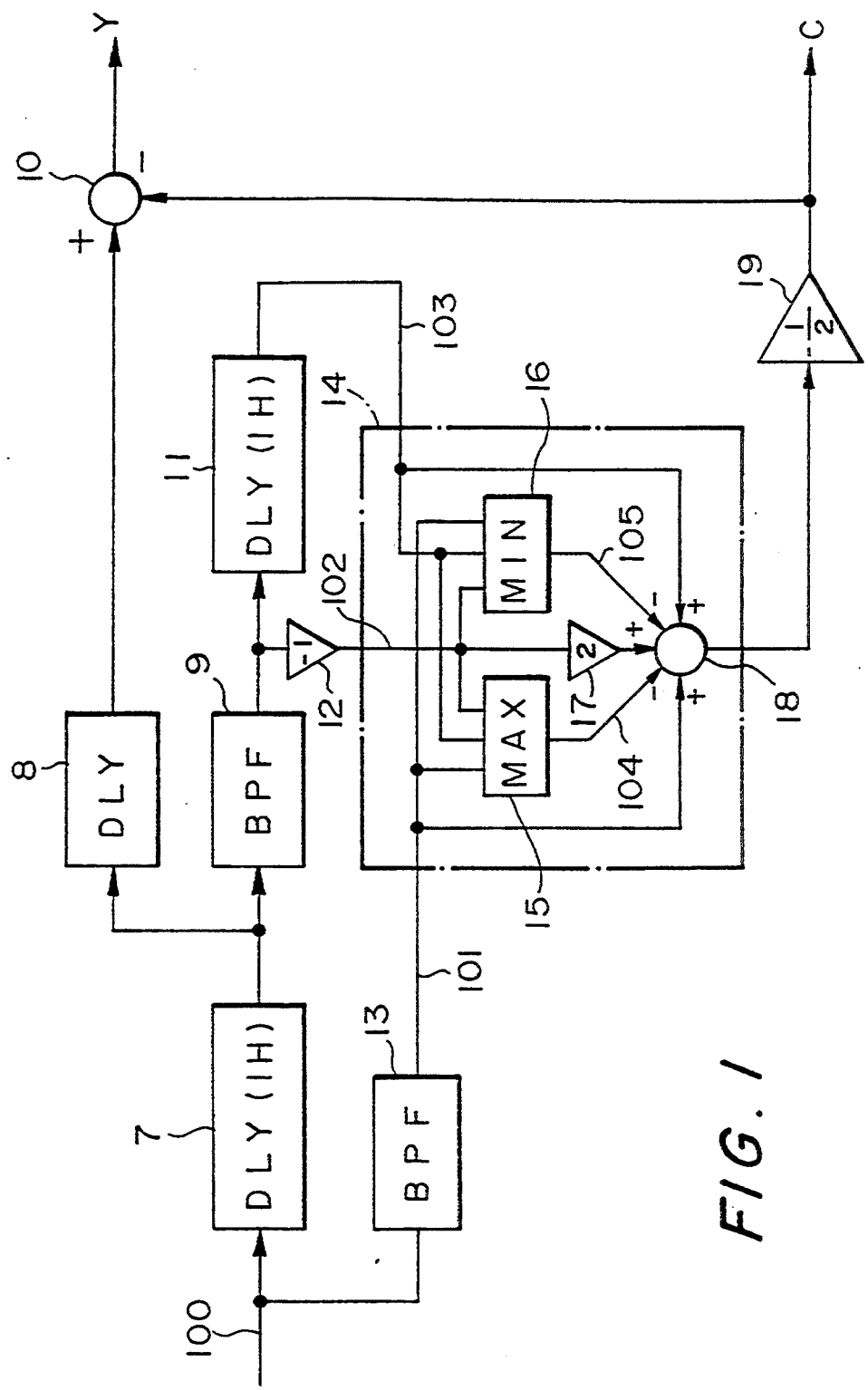
FIG. 1 is a block diagram of a first embodiment of the present invention.

FIG. 1 is a block diagram of a YC separating circuit as a first embodiment of a video signal processor according to the present invention. In FIG. 1, the reference numeral 7 represents a 1H-delay circuit to which a video signal 100 is input. The output of the 1H-delay circuit 7 is input to a delay circuit 8 and a BPF 9. The output of the delay circuit 8 is input to a subtractor 10 and the output of the BPF 9 is input to a 1H-delay circuit 11 and a phase matching circuit 12.

The video signal 100 is additionally input to a BPF 13, and a first signal 101 which is output from the BPF 13 is input to a nonlinear filter 14. A second signal 102 which is output from the phase matching circuit 12 and a third signal 103 which is output from the 1H-delay circuit 11 are also input to the nonlinear filter 14.

The nonlinear filter 14 is composed of a maximum value calculator 15, a minimum value calculator 16, a double amplifier 17 and a synthesizer 18. The first signal 101 is input to the maximum value calculator 15 and the minimum value calculator 16, and also input to the synthesizer 18 as an addition signal (positive signal). The second signal 102 which is output from the phase matching circuit 12, and the third signal 103 which is output from the 1H-delay circuit 11, as well as the first signal 101, are input to the maximum value calculator 15 and the minimum value calculator 16. The output signals 104 and 105 of the maximum value calculator 15 and the minimum value calculator 16, respectively, are input to the synthesizer 18 as subtraction signals (negative signals), and the second signal 102 is input to the synthesizer 18 as an addition signal through the double amplifier 17. The output of the synthesizer 18 is input to a gain adjuster 19, and the output of the gain adjuster 19 is output as a C signal and added to the subtractor 10 as a subtraction signal, the output of the subtractor 10 being output as a Y signal.

Figure 3B:
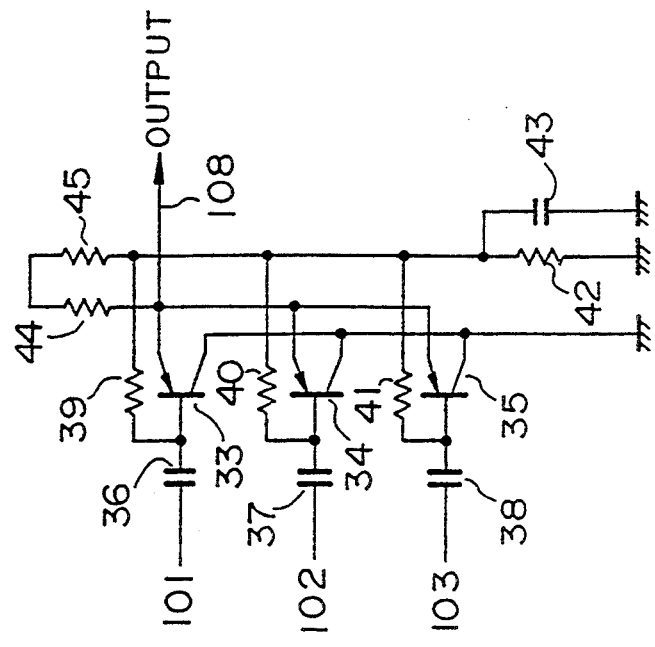
FIGS. 3 (a) and 3 (b) are circuit diagrams of the maximum value calculator and the minimum value calculator, respectively, which are used in the first to fourth embodiments of the present invention.
Figure 3A:
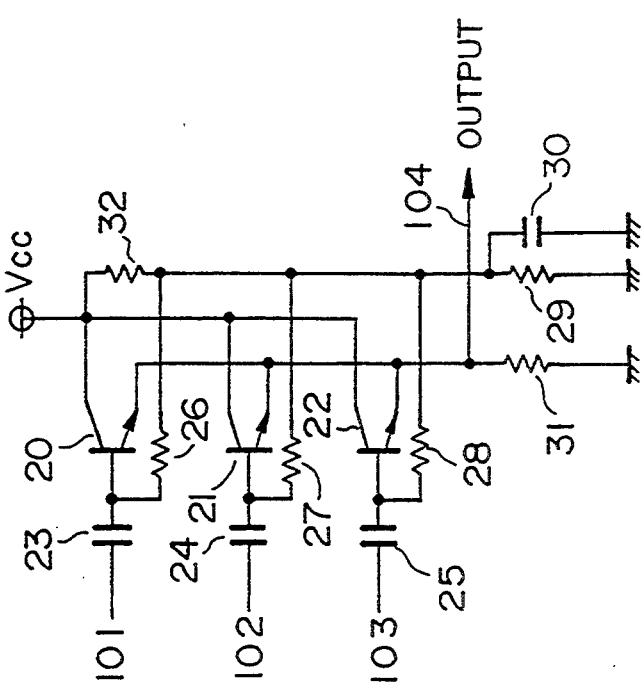

FIGS. 3(a) and 3(b) show the concrete circuits of the maximum value calculator 15 and the minimum value calculator, respectively.

In FIG. 3(a), the reference numerals 20 to 22 represent NPN transistors, to the respective bases of which the signals 101 to 103 are input through capacitors 23 to 25, respectively. The respective bases are connected to one end a resistor 29 and one end of a capacitor 30 through resistors 26 to 28, respectively, and the other ends of the resistor 29 and the capacitor 30 are grounded. The collectors of the transistors 20 to 22 are connected to the power source Vcc and the emitters are grounded through a resistor 31. The output thereof is supplied as an output signal 104. The power source Vcc is connected to one end of the resistor 29 and one end of the capacitor 30 through a resistor 32.

In FIG. 3(b), the reference numerals 33 to 35 represent PNP transistors, to the respective bases of which the signals 101 to 103 are input through capacitors 36 to 38, respectively. The respective bases are connected to one end a resistor 42 and one end of a capacitor 43 through resistors 39 to 41, respectively, and the other ends of the resistor 39 and the capacitor 43 are grounded. The emitters thereof are connected to one end of a resistor 42 and one end of the capacitor 43 through resistors 44 and 45 and also outputs an output signal 108. The collectors thereof are grounded.

The operation of this embodiment will now be explained. The video signal 100 is passed through the BPF 13 and input to the maximum value calculator 15 and the minimum value calculator 16 in the nonlinear filter 14 in the form of the first signal 101 in the frequency band not lower than the frequency band for a color signal. The video signal 100 is passed through the 1H-delay circuit 7, the BPF 9 and the phase matching circuit 12 and input to the maximum value calculator 15 and the minimum value calculator 16 in the form of the second signal 102 which is in the frequency band not lower than the frequency band for a color signal and is output after the first signal 101 with a delay of 1H. The output of the BPF 9 is passed through the 1H-delay circuit 11 and input to the maximum value calculator 15 and the minimum value calculator 16 in the form of the third signal 103 which is in the frequency band not lower than the frequency band for a color signal and is output after the first signal 101 with a delay of 2H's. That is, the first to third signals 101 to 103 are in the frequency band for a color signal and are consecutively output with a delay of 1H in series. The phases of the first to third signals are matched in the color subcarrier frequencies. The phase matching circuit 12 is an amplifier having a gain of −1 dB, namely, an amplifier for shifting the phase by 180 degrees. This is because the color signal is inverted for every H.

The maximum value calculator 15 outputs the maximum value of the first to third signals 101 to 103 which are input to the bases of the transistors 20 to 22, respectively, to the emitter as the output signal 104. For example, if the signal 101 is the maximum, the transistor 20 acts as an emitter follower and the signal 104 having the same amplitude as the signal 101 is taken out. In an ordinary case, the potential of the connecting point of the resistor 32 and the resistor 29 is set at about Vcc/2. No electric conduction is established between the bases and the emitters of the transistors other than that having the maximum input.

The minimum value calculator 16 outputs the minimum value of the first to third signals 101 to 103 which are input to the bases of the transistors 39 to 41, respectively, to the emitter as the output signal 105 in the same way as the maximum value calculator 15 because the PNP transistors are adopted as the transistors 39 to 41.

The output signals 104 and 105 of the maximum value calculator 15 and the minimum value calculator 16 are input to the synthesizer 18 as subtraction signals, and the first signal 101, the third signal 103 and the doubled second signal which is obtained by amplifying the second signal 102 by the double amplifier 17, are also input to the synthesizer 18 as addition signals. The output of the synthesizer 18 is an improved color signal output with a delay of 1H, as will be described later. It is therefore possible to obtain a luminance signal Y and a color signal C by compounding the video signal output from the 1H-delay circuit 7 with a delay of 1H and this color signal by the subtractor 10 in the same way as a conventional video signal processor.

Figure 4:
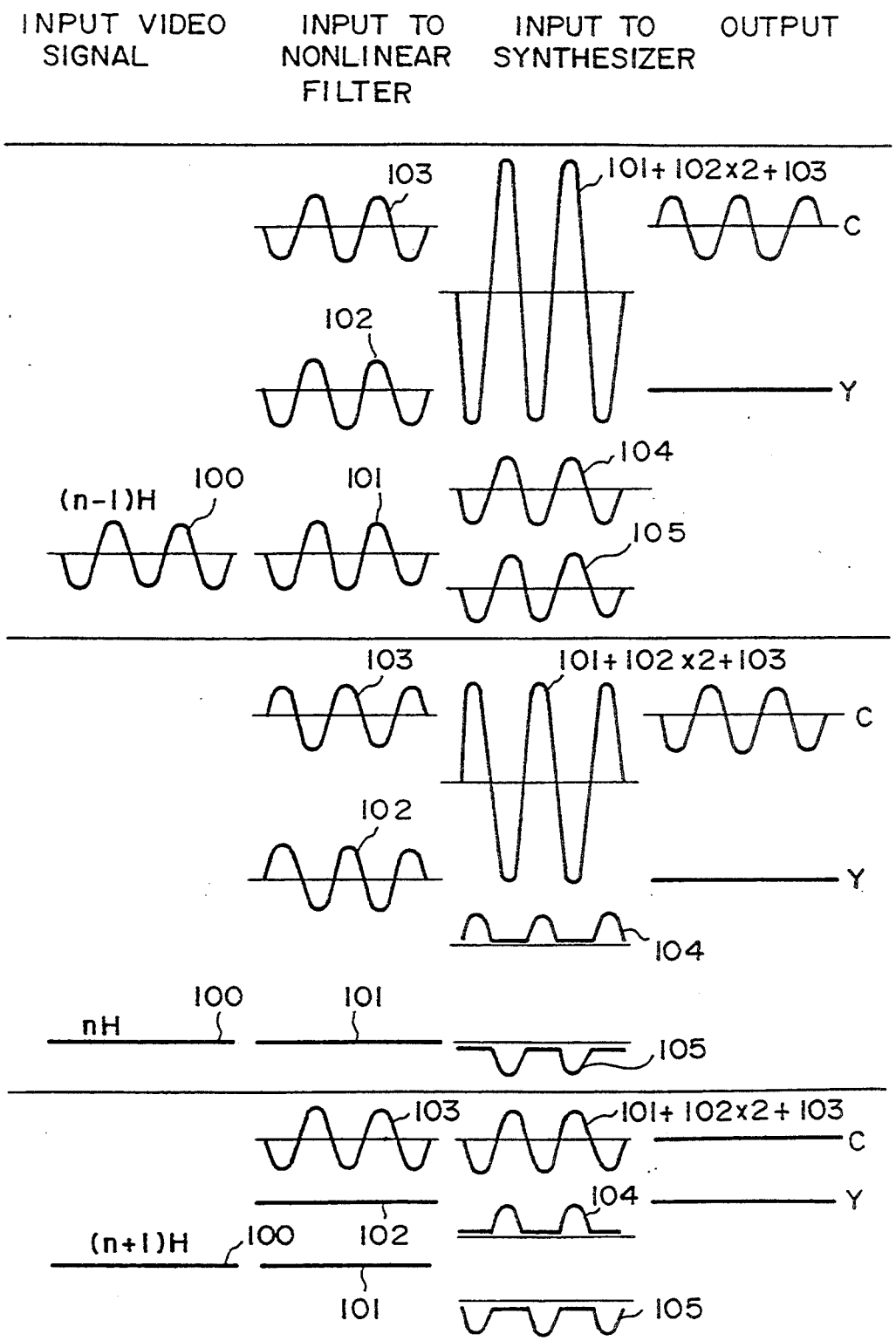
FIG. 4 shows the wave form of each portion of the first and second embodiments of the present invention.
Figure 18:
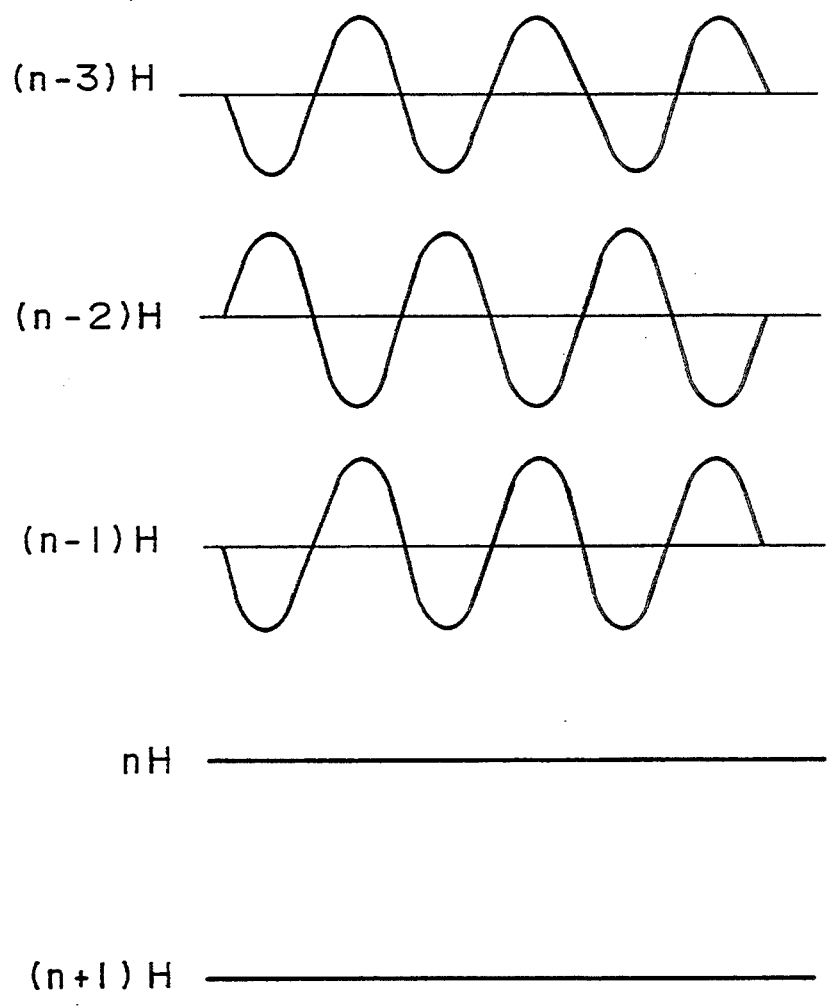
FIG. 18 is a wave form of a video signal input.

FIG. 4 shows a wave form of each portion of the embodiment when the video signals 100 similar to those for the (n−1)th H, n-th H and (n+1)th H shown in FIG. 18 are input. As shown in FIG. 4, when the video signal 100 for the (n−1)th H is input, the first to third signals 101 to 103 input to the nonlinear filter 14 have the same phase and same amplitude, so that the outputs 104, 105 of the maximum value calculator 15 and the minimum value calculator 16, respectively, have the same phase and the same amplitude. Therefore, the output of the synthesizer 18, namely, (the signal 101+the doubled signal 102+signal 103−signal 104−signal 105) has the same phase as the signals 101 to 103 and twice the amplitude of the signals 101 to 103. The amplitude of the output of the synthesizer 18 is reduced to ½ and the phase thereof is inverted by the gain adjuster 19 and is output as the C signal which corresponds to the color signal for the (n−2)th H. The color component in the Y signal component for the (n−2)th H, which is output from the delay circuit 8, is cancelled by the C signal in the subtractor 10.

When the video signal 100 for the n-th H is input, there is no color signal component in the video signal 100, so that only the first signal 101 becomes zero. Therefore, the output signal 104 of the maximum value calculator 15 is in the form of a positive half wave and the output signal 105 of the minimum value calculator 16 is in the form of a negative half wave. As a result, the output of the synthesizer 18 is a signal which has the same phase as the signals 102 and 103 and twice the amplitude thereof. Therefore, the gain adjuster 19 produces the output C which corresponds to the signal for the (n−1)th H and the subtractor 10 cancels the color component in the Y signal component.

When the video signal for the (n+1)th H is input, only the third signal 103 remains as the color signal, and the output signal 104 of the maximum value calculator 15 is in the form of a positive half wave and the output signal 105 of the minimum value calculator 16 is in the form of a negative half wave. Therefore the output of the synthesizer, which is (the signal the 103−the signal 104−the signal 105), becomes zero. As a result, there is no output C, and the C signal corresponds to a color signal for the n-th H. When the video signal 100 for the (n+2)th H is input, the nonlinear filter 14 has no input. Hence, there is neither output Y nor output C.

In these operations, since the output Y is obtained from the output of the 1H-delay circuit 7 on each line, the line for the output Y agrees with the line for the output C.

Figure 19:
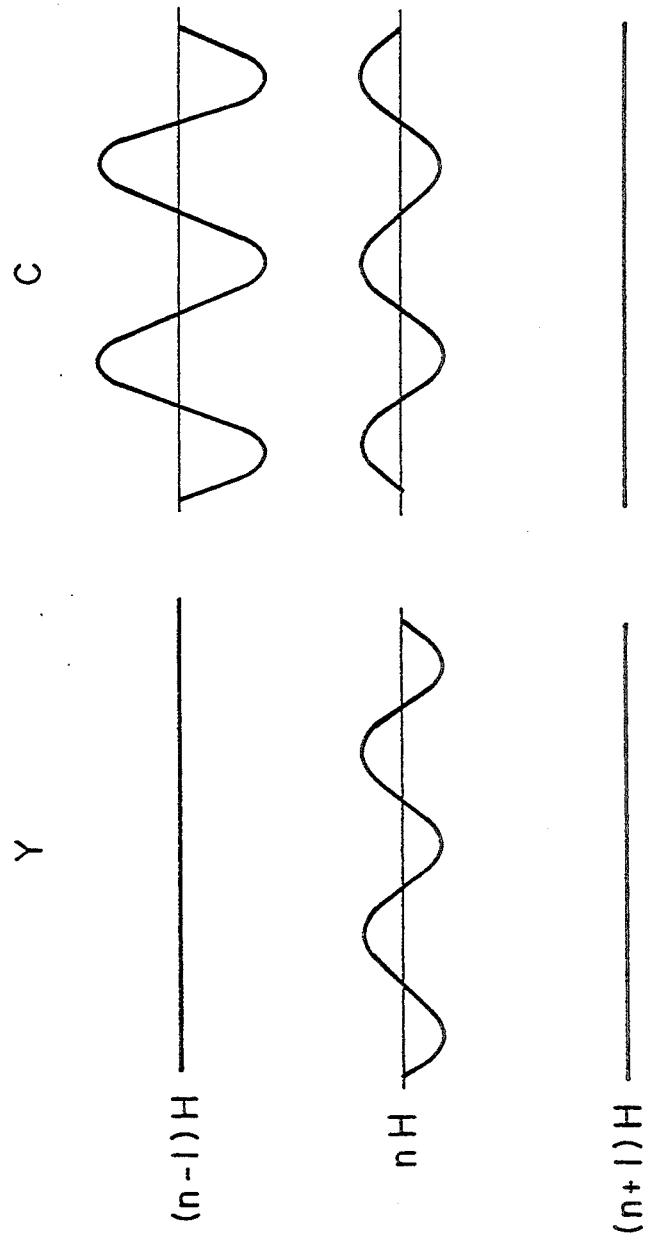
FIG. 19 shows the wave form of each portion of the conventional video signal processor.

When the output on each line is compared with that in the conventional filter shown in FIG. 19, it is observed that the output on the n-th H becomes zero in this embodiment, and that the color edging and dot disturbance have been removed.

Figure 5:
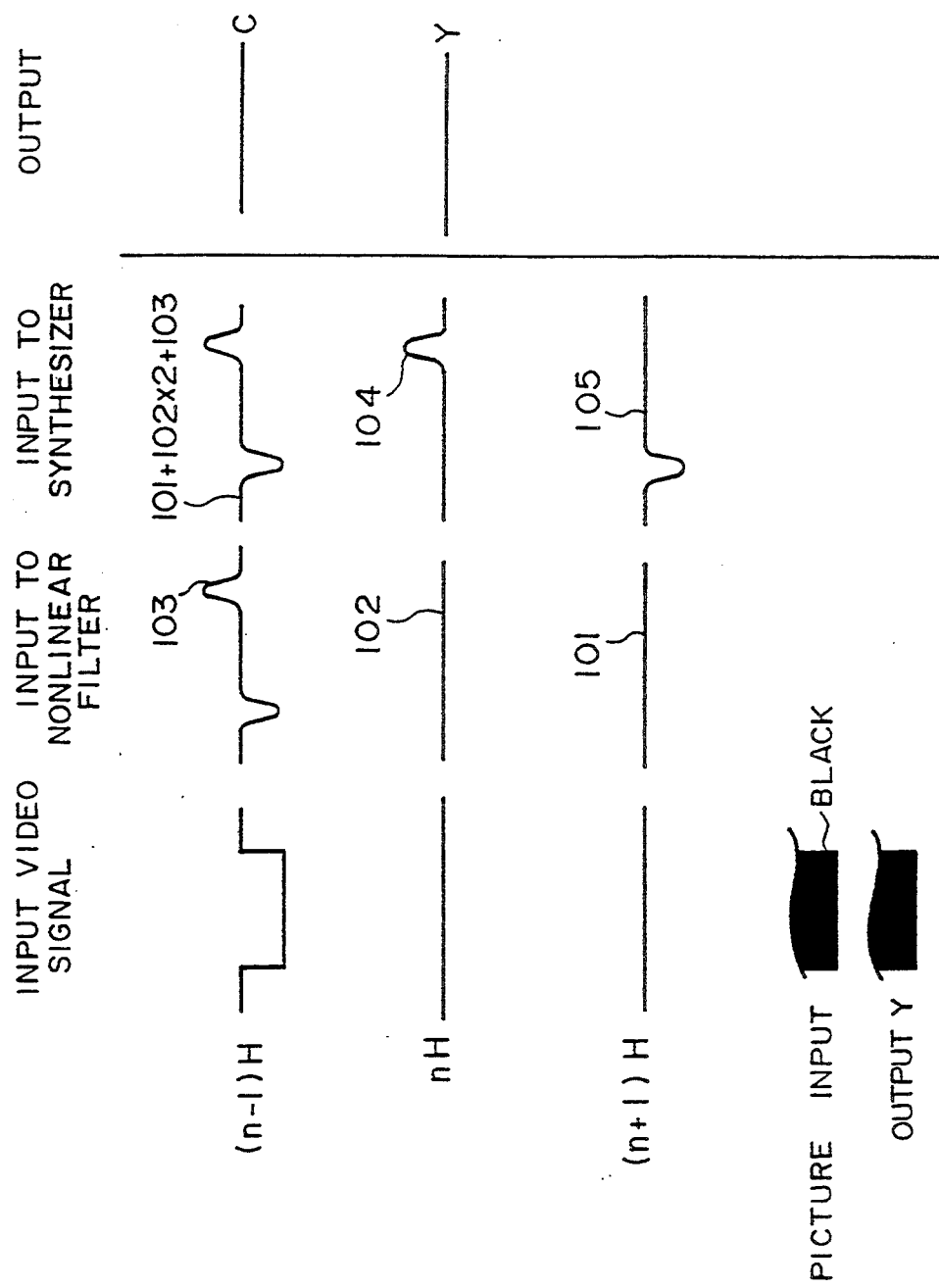
FIG. 5 shows the wave form of each portion of the first and second embodiments of the present invention with respect to a different video signal input.

The influence on the luminance signal is shown in FIG. 5. It is assumed that in the picture in which the black bar is sagging and is cut at the n-th H, the video signal 100 for the (n+1)th H is input. The third signal 103 generated when the input video signal 100 passes through the 1H-delay circuits 7 and 11 has a transient when it passes through the BPF 9. Since the second signal 102 and the first signal 101 are zero, the output signal 104 of the maximum value calculator 15 is the positive transient of the third signal 103, and the output signal 105 of the minimum value calculator 16 is the negative transient of the third signal 103. The output of the synthesizer 18 is therefore zero, and the output C and the output Y contain no color component. In other words, with respect to the signal for the n-th H which is output when the video signal 100 for the (n+1)th H is input, neither output Y nor output C is generated, thereby causing neither cross color nor deterioration in the resolution, unlike in the conventional video signal processor.

Figure 2:
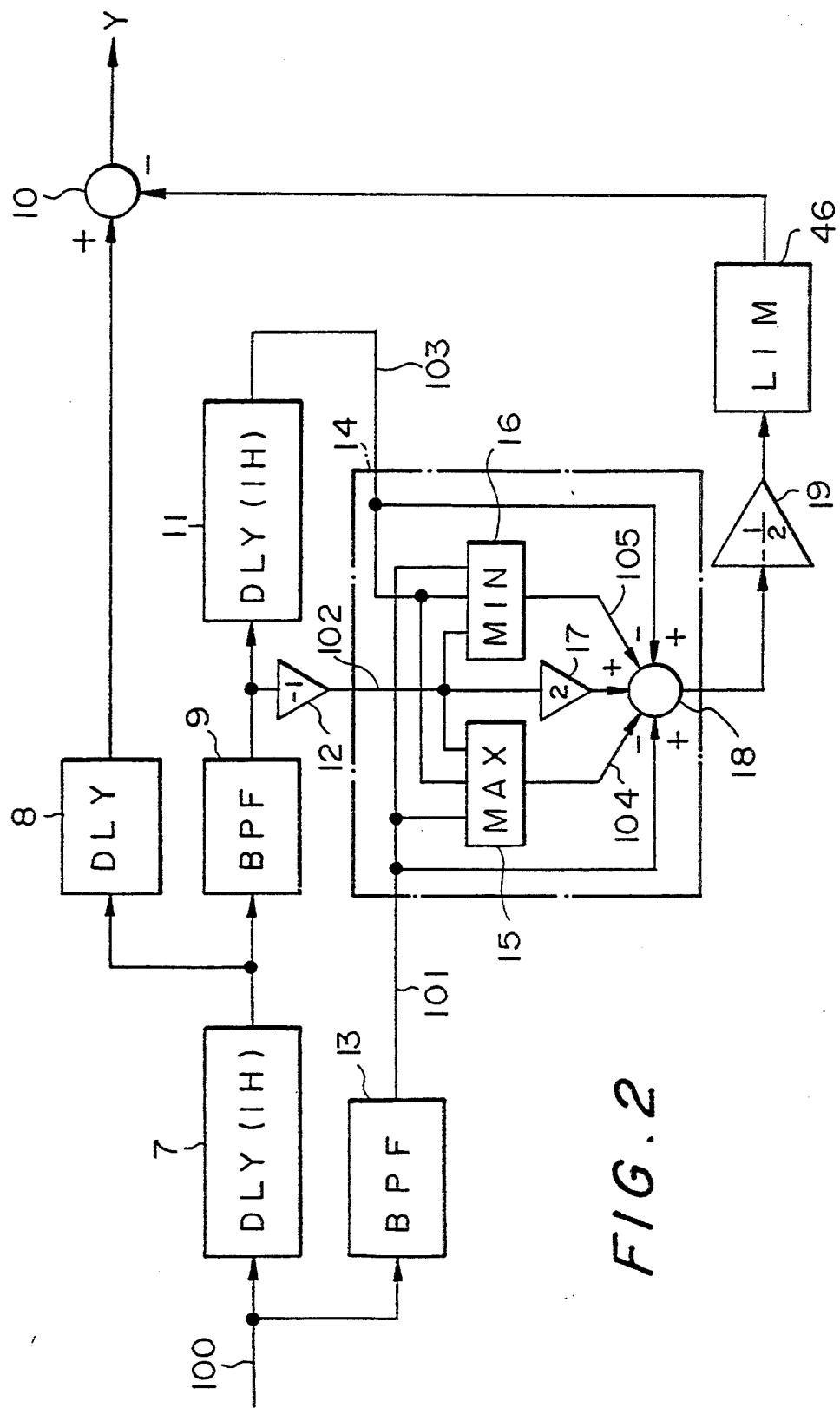
FIG. 2 is a block diagram of a second embodiment of the present invention.

FIG. 2 shows a noise filter utilizing horizontal correlation as a second embodiment of the present invention. In FIG. 2, the reference numeral 46 represents an amplitude limiter provided between the gain adjuster 19 and the subtractor 10. The output of the amplitude limiter 46 is input to the subtractor 10 as a subtraction signal. Since the other structure is the same as that of the YC separating circuit shown in FIG. 1, the same reference numerals are provided for the corresponding elements and explanation thereof will be omitted.

The operation of the noise filter having the above-described structure will now be explained. A luminance signal containing noise is input as the video signal 100. The operation of the noise filter in the flow chart from the video signal 100 to the gain adjuster 19 is the same as the first embodiment. In this way, a signal corresponding to a color signal is output from the gain adjuster 19. Noise signals having different phases in lines, for example, are output, and the luminance signals having the same phase are not output for the respective lines. More specifically, when a luminance signal is input, noise having a frequency in the vicinity of $(2N+1)/2TH$ (N: integer) and a small amplifier is output from the gain adjuster 19 and input to the subtractor 10 through the amplifier limiter 46. The subtractor 10 operates a noise filter so as to cancel the noise in the luminance signal. An oblique stripe component in the luminance signal can have a similar frequency, but since the amplitude of the component at a high level is not limited by the amplifier limiter 46 and the component is not cancelled by the subtractor 10, the lowering in the oblique resolution is prevented.

The noise filter of this embodiment does not cause the lowering in the vertical resolution, as in the first embodiment, thereby eliminating the defect of the conventional video signal processor.

The synthesizer 18 can carry out the same operation as that in the above explanation if the ratio of the input to the synthesizer 18 is the same as in the first and second embodiments. For example, if the compounding polarities of the synthesizer 18 are changed [so as to have the input of the signal 104+the signal 105−(the signal 101+the signal 102×2+the signal 103)], the gain of the gain adjuster 10 is changed to ½ dB. If all the inputs to the synthesizer 18 are reduced to ½, the gain of the gain adjuster 19 is changed to −1 dB. In FIG. 1, the output of the synthesizer 18 may be utilized directly as a color signal. Although the output of the synthesizer 18 has a different phase and a different amplitude from those of the color signal component of the video signal 100, since it can be used as a color signal as it is, the gain adjuster 19 is not particularly required.

Figure 6:
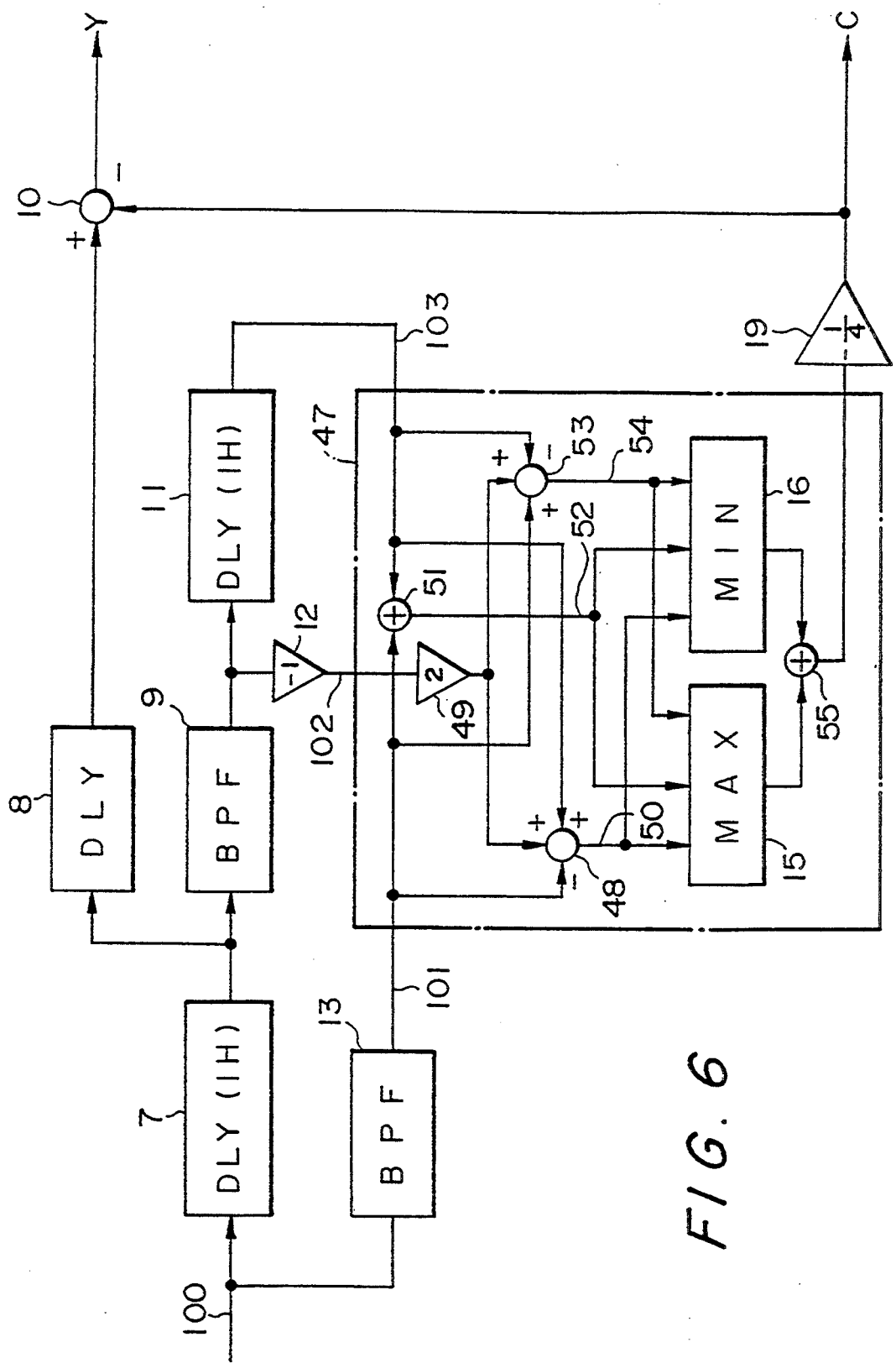
FIG. 6 is a block diagram of a third embodiment of the present invention.

FIG. 6 shows a YC separating circuit as a third embodiment of the present invention. This embodiment has the same structure as the first embodiment shown in FIG. 1 except for a nonlinear filter 47. The nonlinear filter 47 has a first synthesizer 48 for compounding the antiphase first signal 101, the doubled second signal 102 which is amplified by a double amplifier 49 and the third signal 103, and the output 50 of the first synthesizer 48 is input to the maximum value calculator 15 and the minimum value calculator 16. The reference numeral 51 represents a second synthesizer for adding the first signal 101 and the third signal 103 and inputting the output 52 to the maximum value calculator 15 and the minimum value calculator 16. The reference numeral 53 represents a third synthesizer for compounding the first signal 101, the doubled second signal 102 and the antiphase third signal 103 and inputting the output 54 to the maximum value calculator 15 and the minimum value calculator 16. The maximum value calculator 15 and the minimum value calculator 16 are the same circuit as in the first and second embodiments. The outputs of the maximum value calculator 15 and the minimum value calculator 16 are added by an adder 55 and the sum is input to the gain adjuster 19.

Figure 8:
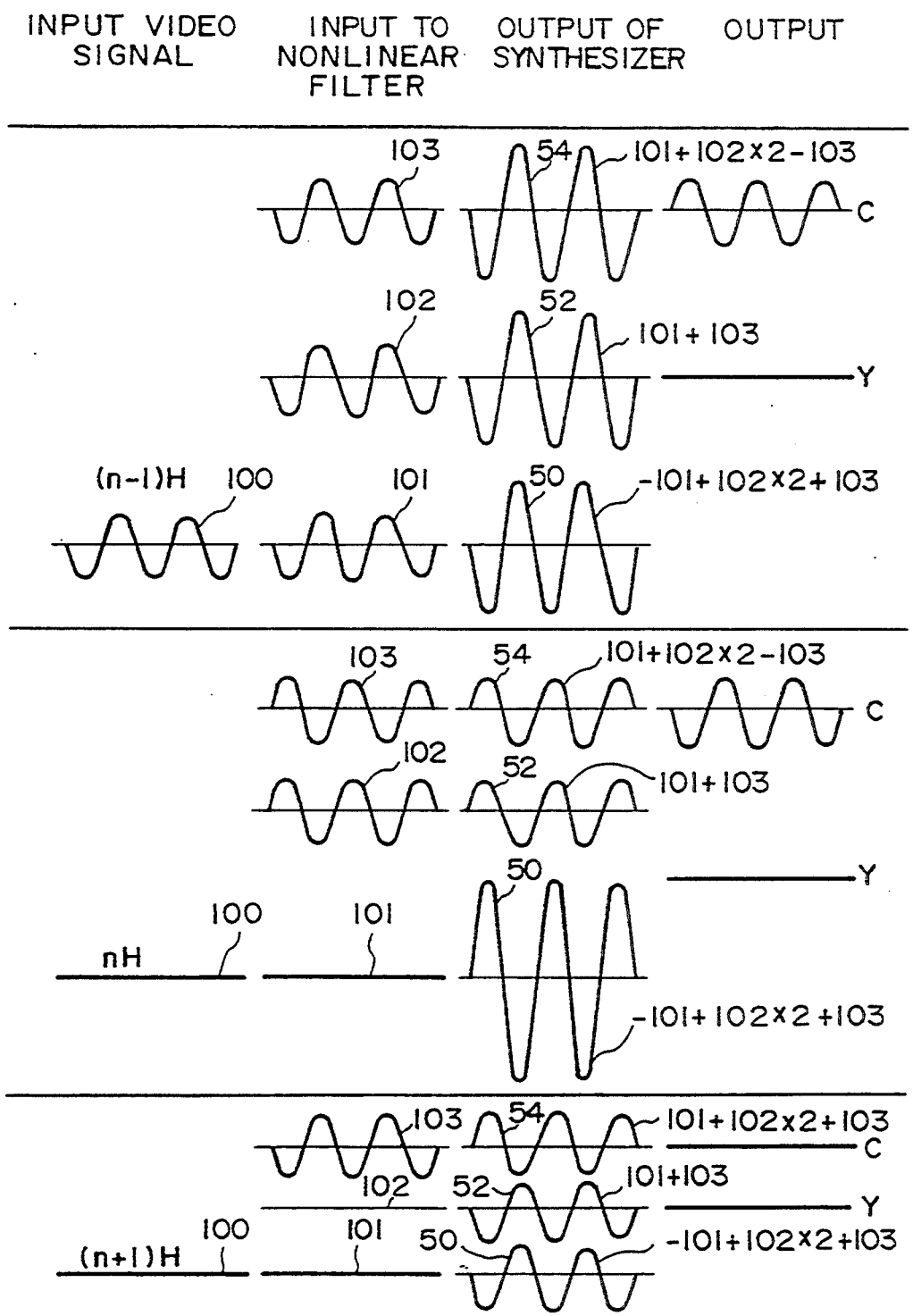
FIG. 8 shows the wave form of each portion of the third and fourth embodiments of the present invention.

The operation of the third embodiment will now be explained. FIG. 8 shows a wave form of each portion of the embodiment when the video signal s 100 for the (n−1) th H, n-th H and (n+1)th H are input. When the video signal 100 for the (n−1)th H is input, the first to third signals 101 to 103 input to the nonlinear filter 47 have the same phase and the same amplitude, so that the outputs 50, 52 and 54 of the first, second and third synthesizers 48, 51 and 53, respectively, have the same phase as the signals 101 to 103 and twice the amplitude thereof. The outputs of the maximum value calculator 15 and the minimum value calculator 16, respectively, also have the same phase as the signals 101 to 103 and twice the amplitude thereof. The output of the adder 55 is multiplied by −¼ and the thus-obtained output C corresponds to the color signal for the (n−2)th H. The color component in the video signal is cancelled by the output C in the subtractor 10 to obtain the Y signal.

When the video signal 100 for the n-th H is input, there is no color signal component in the video signal, so that only the first signal 101 becomes zero. That is, the outputs 52 and 54 of the synthesizers 51 and 53, respectively, having the same phase and the same amplitude as the second and the third signals 102 and 103, and the output 50 of the synthesizer 49 having the same phase as the second and third signals 102 and 103 and three times the amplitude thereof are obtained. Therefore, when the outputs of the maximum value calculator 15 and the minimum value calculator 16 are compounded by the adder 55, a signal having the same phase as the signals 102 and 103 and four times the amplitude thereof is obtained. The output C obtained by multiplying the output of the adder 55 by −¼ corresponds to the color signal for the (n−1)th H. The color component in the video signal is cancelled by the output C in the subtractor 10 to obtain the Y signal.

When the video signal 100 for the (n+1)th H is input, only the third signal 103 remains. The outputs of the synthesizers 48 and 51 have the same phase and the same amplitude as the third signal 103, and the output 54 of the synthesizer 53 has the inverted phase and the same amplitude as the third signal 103. Therefore, when the maximum value and the minimum value thereof are added, the sum is zero. In other words, the output C is a color signal corresponding to a color signal for the n-th H. When the video signal 100 for the (n+2)th H is input, the nonlinear filter 47 has no input and, hence, there is neither output Y nor output C. In these operations, since the output Y is obtained from the output of the 1H-delay circuit 7 on each line, the line for the output Y agrees with the line for the output C.

When the output on each line in the third embodiment is compared with that in the conventional filter shown in FIG. 19, it is observed that the output on the n-th H becomes zero in this embodiment, and that the color edging and dot disturbance have been removed.

Figure 9:
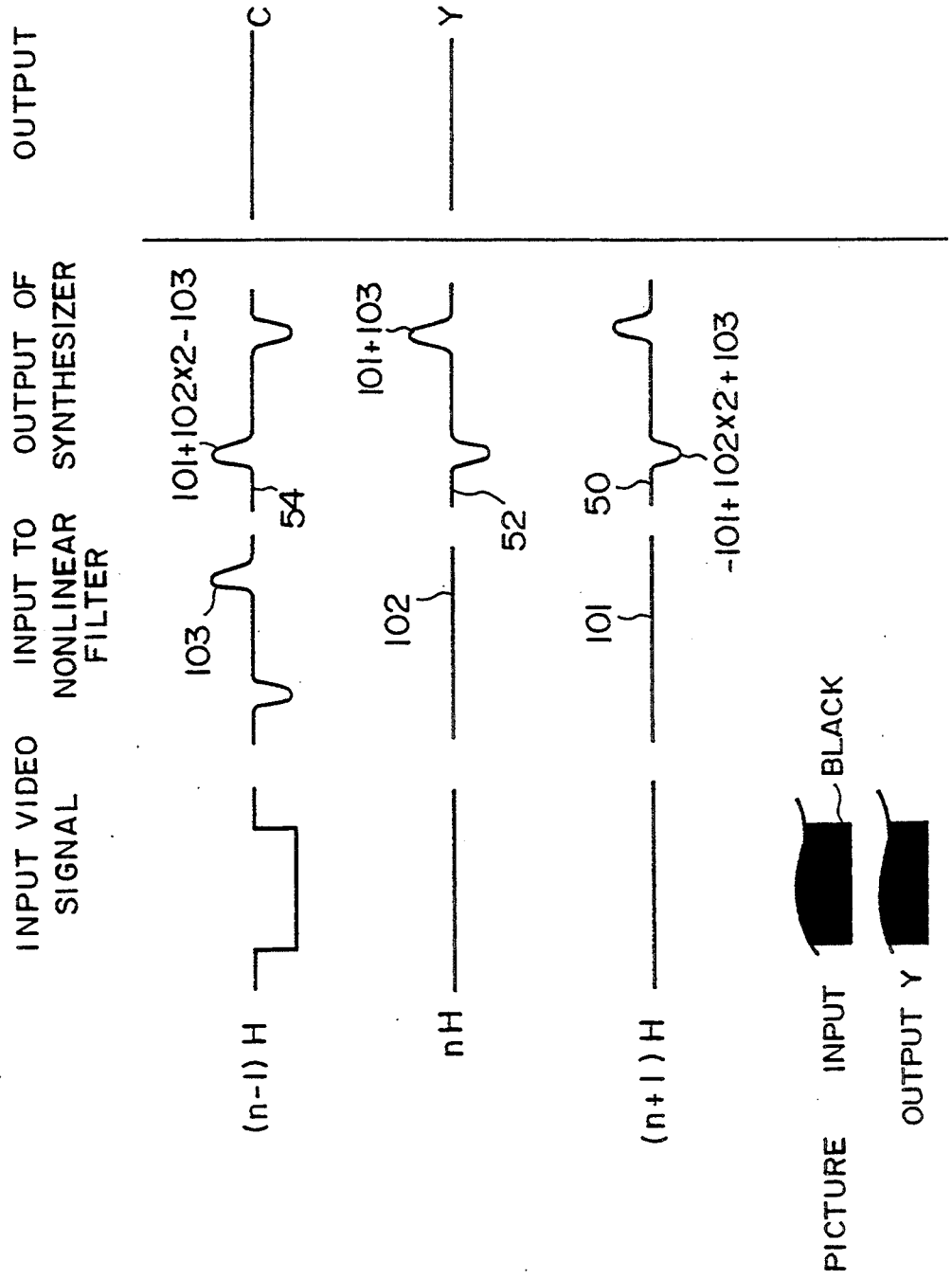
FIG. 9 shows the wave form of each portion of the third and fourth embodiments of the present invention with respect to a different video signal input.

The influence on the luminance signal is shown in FIG. 9. It is assumed that in the picture in which the black bar is sagging and is cut at the n-th H, the video signal 100 for the (n+1)th H is input in the same way as in FIG. 5. The third signal 103 generated when the video signal 100 input for the (n−1)th H passes through the 1H-delay circuits 7 and 11 has a transient when it passes through the BPF 9. Since the second signal 102 and the first signal 101 are zero, the output of the adder 55 is zero and both the output C and the output Y are zero in the same way as when the video signal 100 for the (n+1)th H is input in FIG. 8. Thus, there is neither cross color nor deterioration in the resolution as in the first embodiment.

Figure 7:
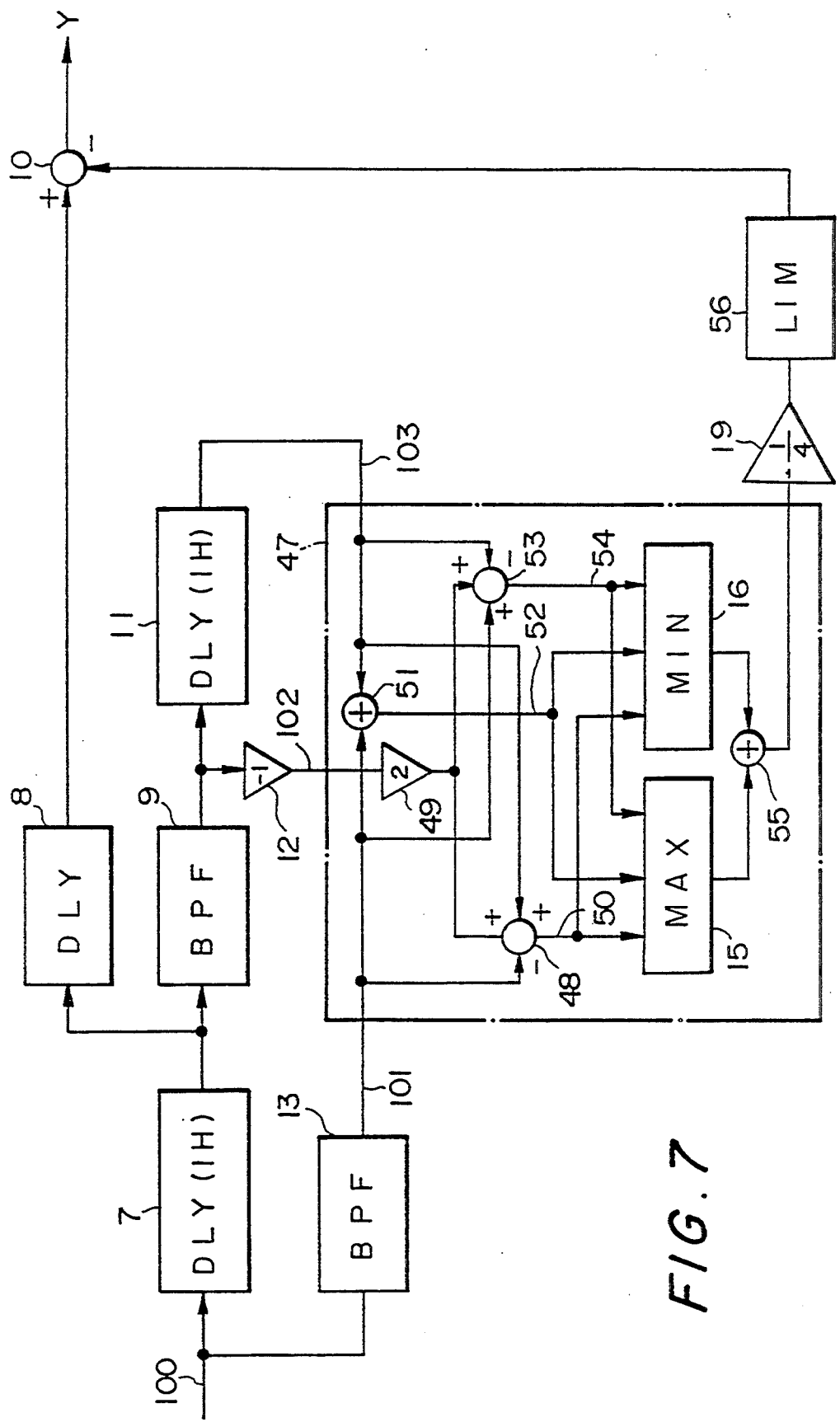
FIG. 7 is a block diagram of a fourth embodiment of the present invention.

FIG. 7 shows a noise filter as a fourth embodiment of the present invention. In FIG. 7, the reference numeral 56 represents an amplitude limiter for inputting the output of the gain adjuster 19 and outputting the output of the gain adjuster 19 to the subtractor 10 as a subtraction signal. The other structure is the same as that of the third embodiment.

The operation of the noise filter having the above-described structure will now be explained. A luminance signal is input as the video signal 100, and the output of the adder 55 is output from the gain adjuster 19 in the form of a signal corresponding to a color signal in the same way as in the third embodiment. Therefore, in the fourth embodiment, there is no lowering in the vertical resolution as in the noise filter of the second embodiment.

The synthesizers 48, 51 and 53 can carry out the same operation as those in the above explanation if the ratio of the input to the synthesizers 48, 51 and 53 are substantially the same as in the third and fourth embodiments. For example, if the compounding polarities of the synthesizers 48, 51 and 53 are changed with each other, the gain of the gain adjuster 10 is changed to ¼ dB. If all the inputs to the synthesizers 48, 51 and 53 are reduced to ½, the gain of the gain adjuster 19 is changed to −1 dB. Although the output of the adder 55 has a different phase and a different amplitude from those of the color signal component of the video signal 100, since it can be used as a color signal as it is, the gain adjuster 19 is not particularly required.

Figure 10:
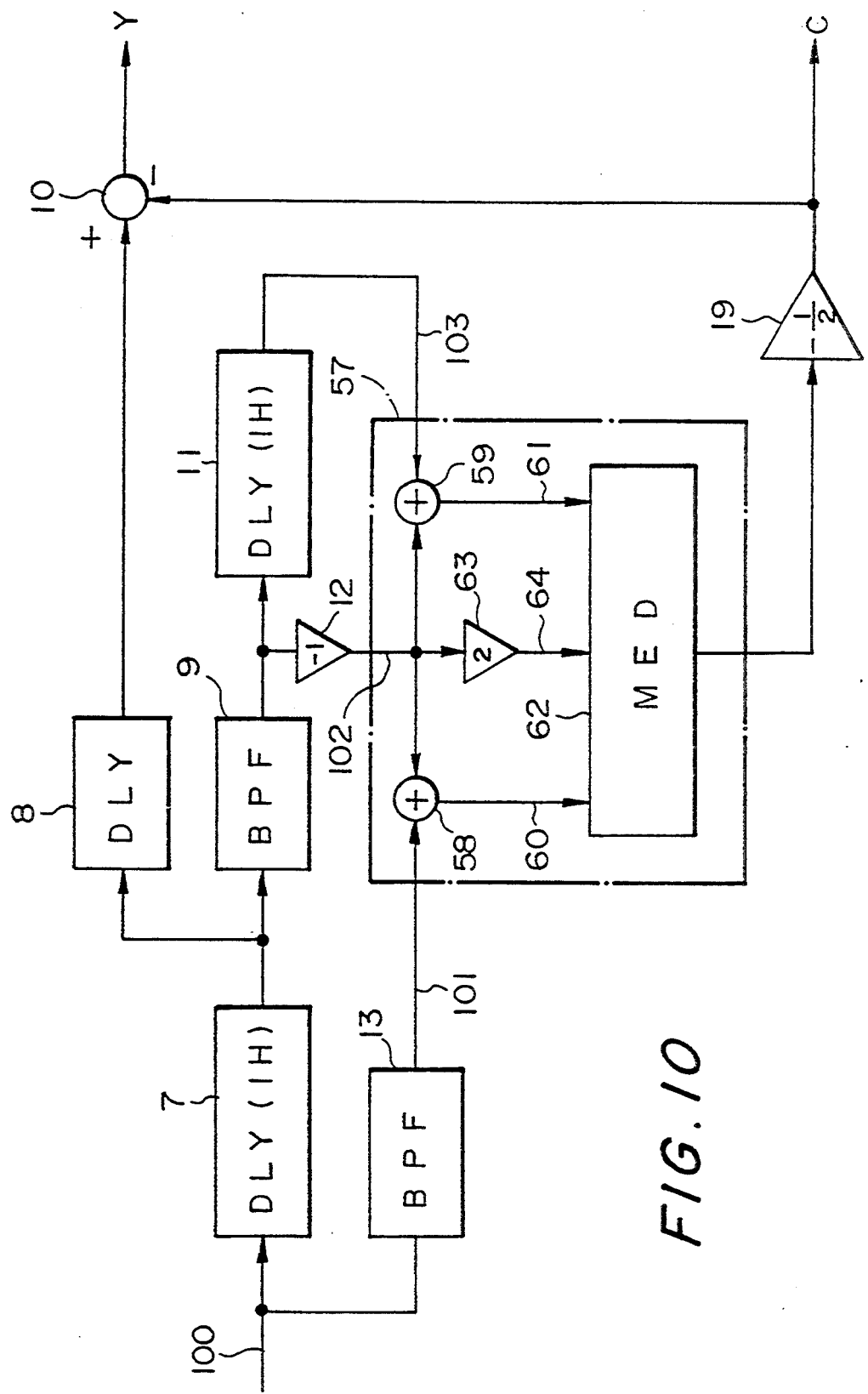
FIG. 10 is a block diagram of a fifth embodiment of the present invention.

FIG. 10 shows a YC separating circuit as a fifth embodiment of the present invention. In FIG. 10, the reference numeral 57 represents a nonlinear filter composed of the following elements. The reference numeral 58 represents an adder for adding the first signal 101 and the second signal 102, 59 an adder for adding the second signal 102 and the third signal 103. The outputs 60 and 61 of these adders 58 and 59, respectively, are input to an intermediate value calculator 62. To the intermediate value calculator 62 is input the output 64 which is obtained by doubling the second signal 102 by a double amplifier 63. The output of the intermediate value calculator 62 is input to the gain adjuster 19. The other structure is the same as those of the first to fourth embodiments.

Figure 12:
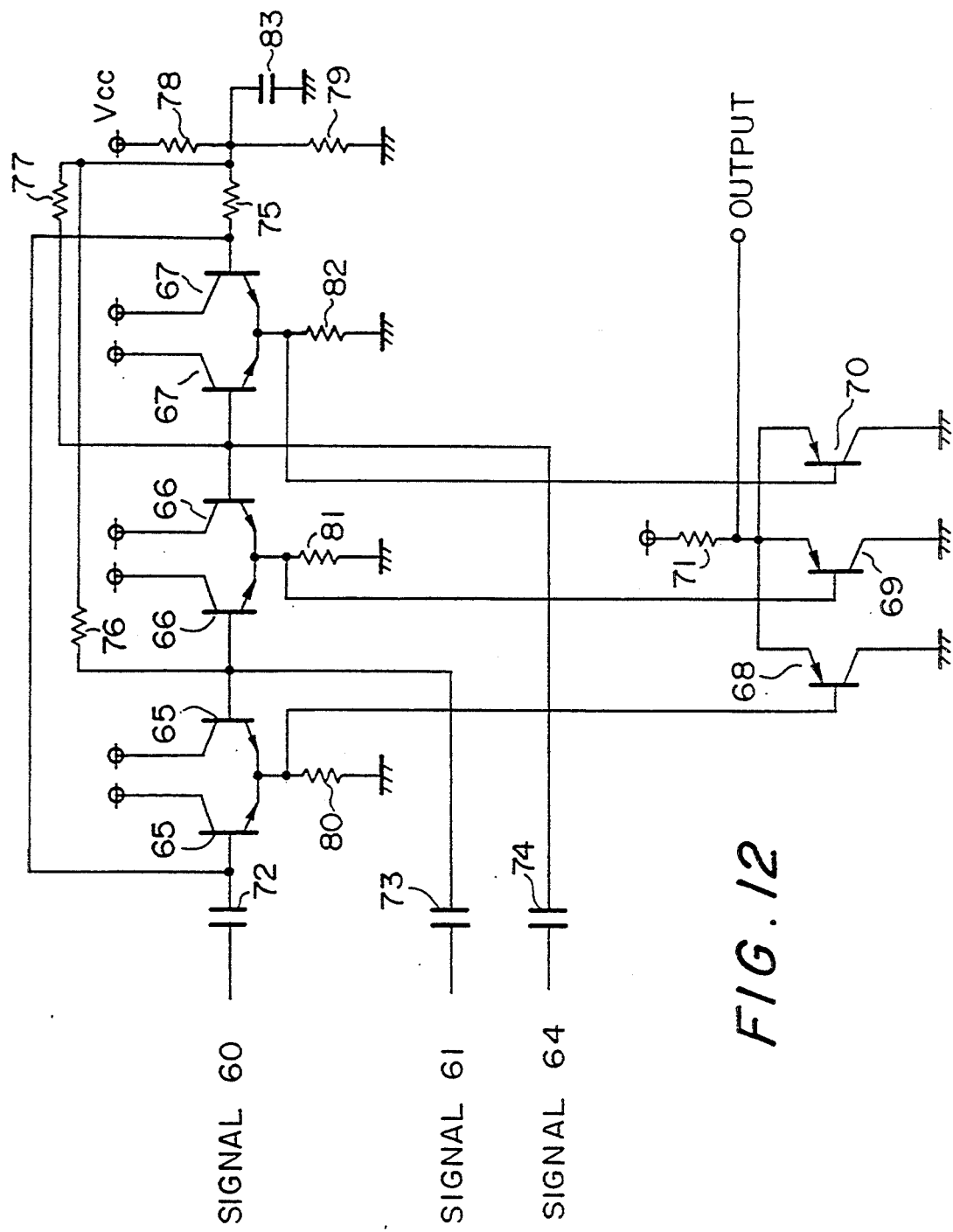
FIG. 12 is a circuit diagram of the intermediate value calculator which is used in the fifth and sixth embodiments of the present invention.

FIG. 12 shows the concrete circuit of the intermediate value calculator 62. In FIG. 12, the reference numerals 65, 66 and 67 each represent a pair of NPN transistors with the emitters connected to each other. The inputs 60 and 61 are connected to the bases of the transistors 65, the inputs 61 and 64 are connected to the bases of the transistors 66, and the inputs 64 and 60 are connected to the bases of the transistors 67. The emitters of the transistors 65, 66 and 67 are connected to the bases of PNP transistors, 68, 69 and 70, respectively, and the emitters of these PNP transistors, 68, 69 and 70 are connected to the power source Vcc through a resistor 71 and the emitter currents are taken out as an output. The collectors of these transistors 68, 69 and 70 are grounded. The reference numerals 72, 73 and 74 represent capacitors connected between the inputs 60, 61 and 64 and the transistors 65 to 67, respectively, and 75 to 77 represent resistors provided between the respective connecting points of the capacitors 72 to 74 and the bases of the transistors 65 to 67 and the connecting points of the resistors 78 and 79 which are connected between the power source Vcc and the grounding. The reference numeral 80 to 82 represent resistors provided between the respective emitters of the transistors 65 to 67 and the grounding, and 83 represents a capacitor connected between the connecting points of the resistors 78 and 79 and ground.

The operation of the YC separating circuit having the above-described structure will be explained. As to the first to third signals 101 to 103 input to the nonlinear filter 57, the first and second signals 101 and 102 are added by the adder 58 and the second and third signals 102 and 103 are added by the adder 59. These outputs 60 and 61 are input to the intermediate value calculator 62. The second signal 102 is amplified by the double amplifier 63 and the output 64 is input to the intermediate value calculator 62. In the intermediate value calculator 62, the pairs of transistors 65 to 67 output the signals 60, 61 and 64, respectively, having the larger value which are input to the respective bases. Therefore, the minimum value of the signals 60, 61 and 64 are not contained in the outputs of the transistors 65 to. 67. Since the transistors 68 to 70 output the minimum value of the signals output by the transistors 65 to 67, an intermediate value is output in consequence. The intermediate value is an improved color signal which is output by a delay of 1H, as will be explained in the following. Therefore, the luminance signal Y and the color signal C are obtained in the same way as in the first and third embodiments.

Figure 13:
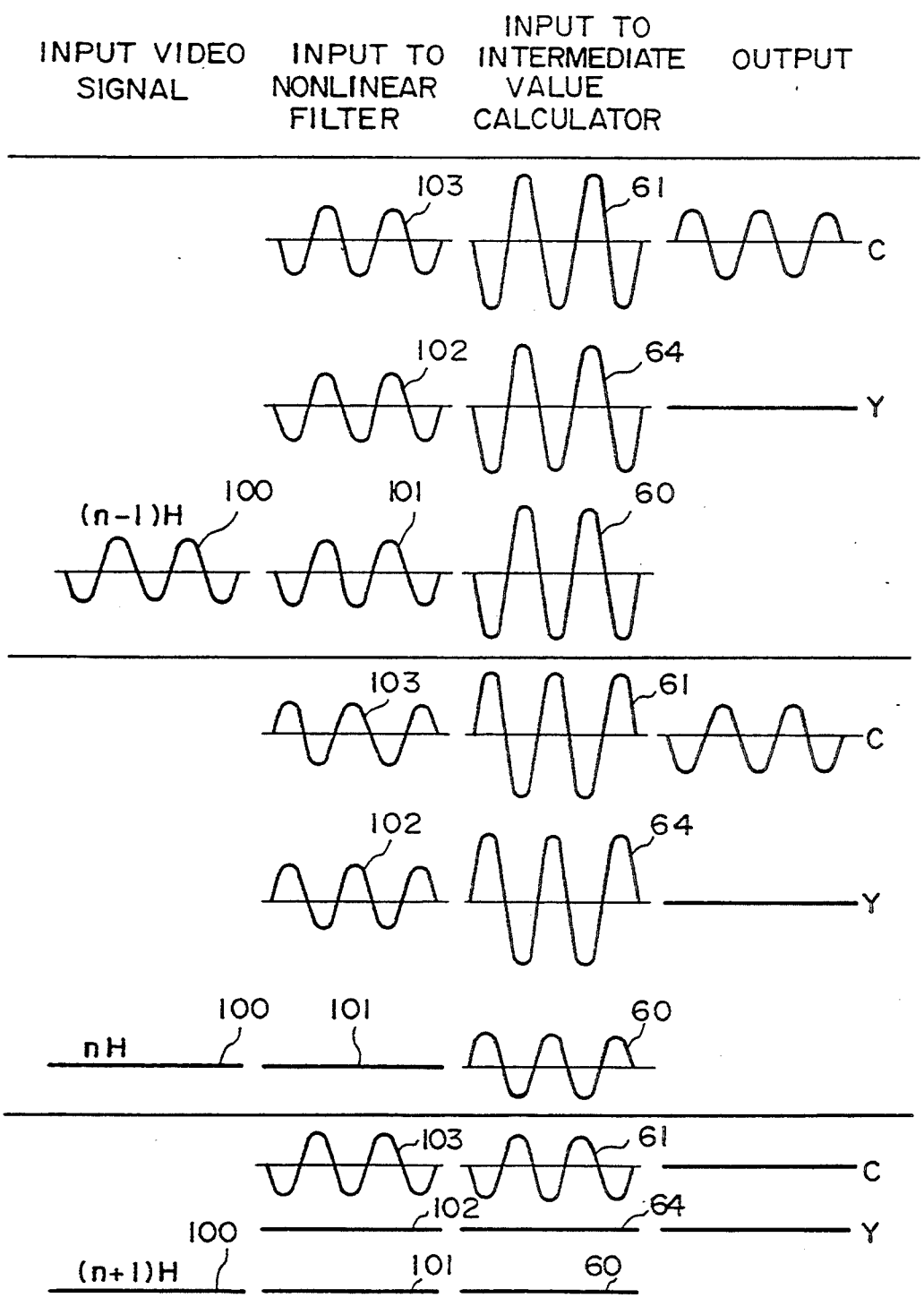
FIG. 13 shows the wave form of each portion of the fifth and sixth embodiments of the present invention.

FIG. 13 shows a wave form of each portion of the embodiment when the video signals 100 for the (n−1)th H, n-th H and (n+1)th H are input. When the video signal 100 for the (n−1)th H is input, the three signals input to the nonlinear filter 57 have the same phase and the same amplitude, so that all the inputs 60, 61 and 64 to the intermediate value calculator 62 have the same phase and the same amplitude. The outputs C corresponding to the color signal for the (n−2)th H is therefore obtained. The color component in the output Y is cancelled by the output C in the subtractor 10. When the video signal 100 for the n-th H is input, there is no color signal component in the video signal, so that only the first signal 101 becomes zero. Therefore, the input 60 is half as large as the other inputs, and an intermediate value is calculated from the inputs 64 and 61. As a result, the output C corresponding to the color signal for the (n−1)th H is obtained. The color component in the output Y is cancelled by the output C. When the video signal 100 for the (n+1)th H is input, only the third signal 103 remains as the input 61. Since both the inputs 60 and 64 are zero, an intermediate value is calculated from these inputs 60 and 64. As a result, there is no output C, which corresponds to the color signal for the n-th H. When the video signal 100 for the (n+2)th H is input, the nonlinear filter 57 has no input and, hence, there is neither output Y nor output C. In these operations, since the output Y is obtained from the output of the 1H-delay circuit 7 on each line, the line for the output Y agrees with the line for the output C.

When the output on each line in the fifth embodiment is compared with that in the conventional filter shown in FIG. 19, it is observed that the output on the n-th H becomes zero in this embodiment, and that the color edging and dot disturbance have been removed.

Figure 14:
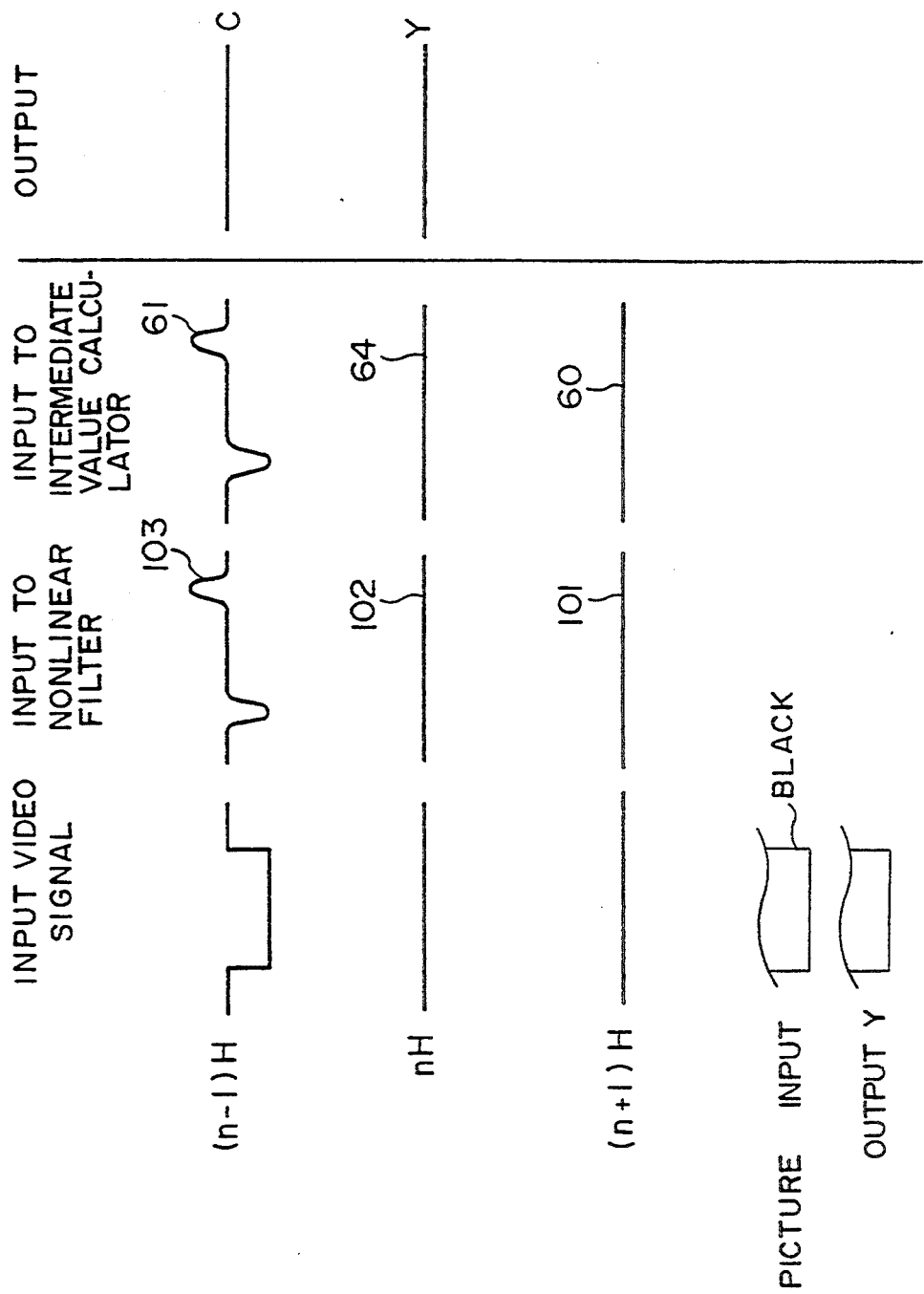
FIG. 14 shows the wave form of each portion of the fifth and sixth embodiments of the present invention with respect to a different video signal input.
Figure 15:
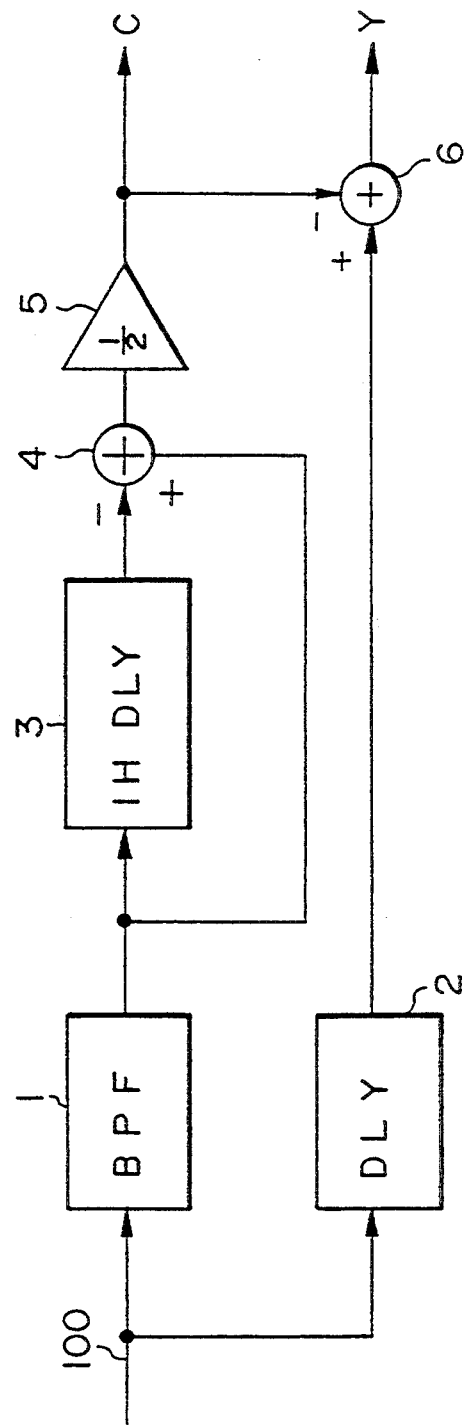
FIG. 15 is a block diagram of a conventional video signal processor.
Figure 16:
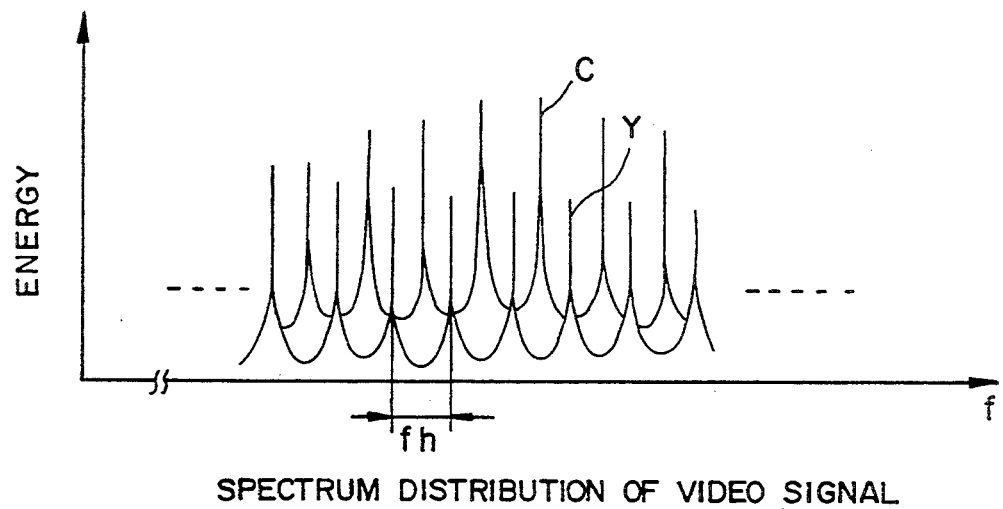
FIG. 16 is a spectrum distribution diagram of the conventional video signal processor shown in FIG. 15.
Figure 17:
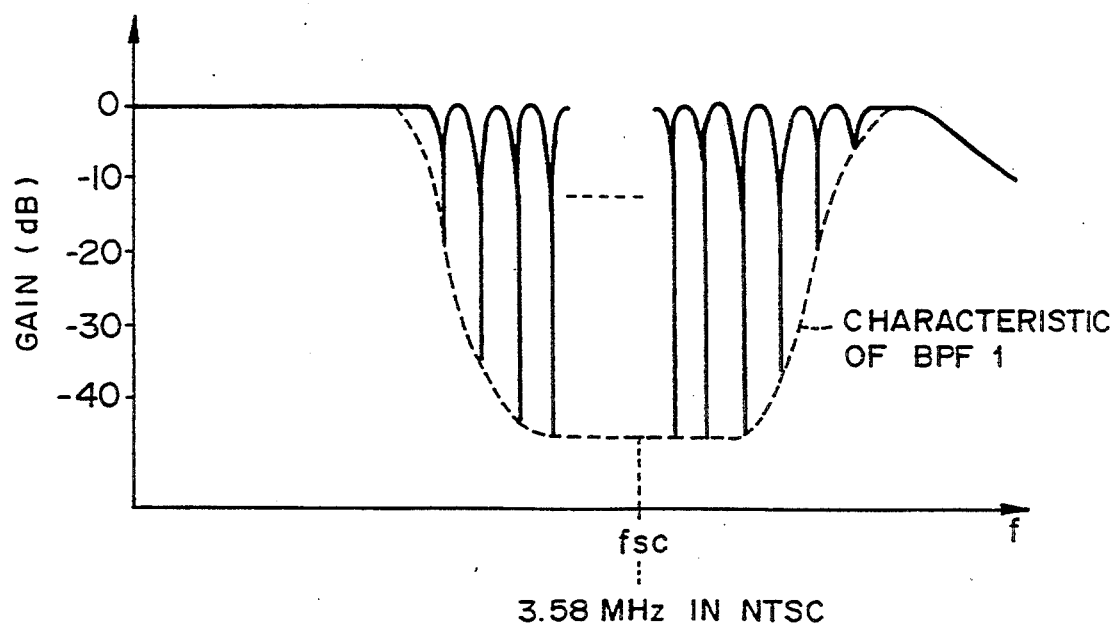
FIG. 17 shows the frequency characteristic of the conventional video signal processor shown in FIG. 15.

The influence on the luminance signal is shown in FIG. 14. It is assumed that in the picture in which the black bar is sagging and is cut at the n-th H, the video signal 100 for the (n+1)th H is input. The third signal 103 generated when the video signal 100 input for the (n−1)th H passes through the 1H-delay circuits 7 and 11 has a transient when it passes through the BPF 9. Since the second signal 102 and the first signal 101 are zero, in the intermediate value calculator 62, the input 61 is equal to the third signal 102, and the other inputs are zero. Therefore, the output of the intermediate value calculator 62 is calculated from the inputs 60 and the input 64, and both the output C and the output Y are zero. In other words, with respect to the signal for the n-th H, neither the output Y nor the output C is generated, thereby causing neither cross color nor the deterioration in the vertical resolution.

Figure 11:
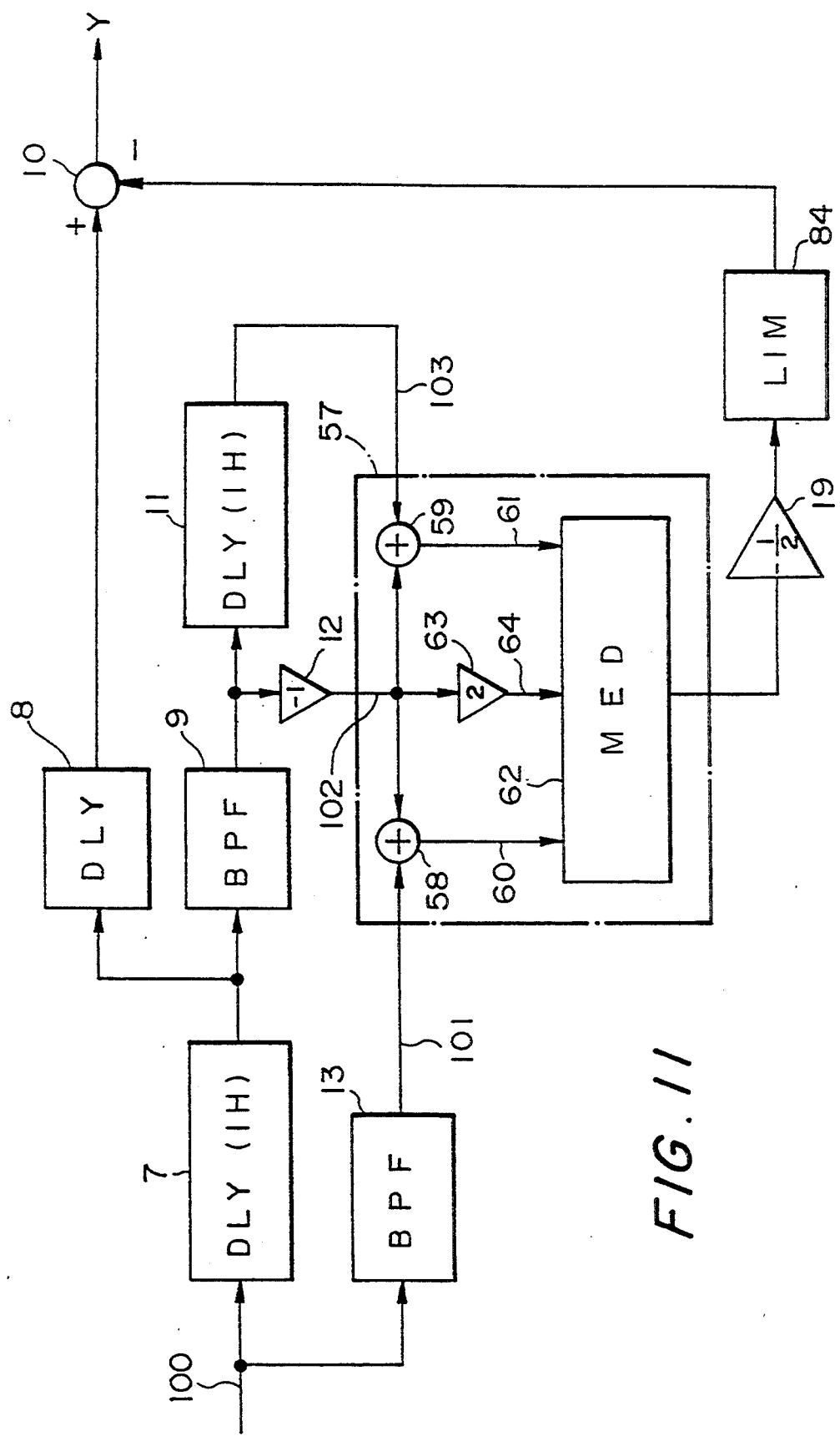
FIG. 11 is a block diagram of a sixth embodiment of the present invention.

FIG. 11 shows a noise filter as a sixth embodiment of the present invention. In FIG. 11, the reference numeral 84 represents an amplitude limiter provided between the gain adjuster 19 and the subtractor 10 as in the second and fourth embodiments. The other structure is the same as the fifth embodiment.

The noise filter having the above-described structure carries out the same operation as the second and fourth embodiments. Therefore, the noise filter of this embodiment is also effective for causing no reduction in the vertical resolution.

In the fifth and sixth embodiment, the inputs 60, 61 and 64 of the intermediate value calculator 62 are (the first signal 101+the second signal 102), (the doubled second signal 102) and (the second signal 102+the third signal 103), respectively. However, since the object of the intermediate value calculator 62 is to calculate an intermediate value, these inputs may be any other values so long as the ratio is substantially constant. For example, the inputs 60, 61 and 64 may be (the average of the first signal 101 and the second signal), (the second signal 102) and (the average of the second signal 102 and the third signal 103). In this case, since the output of the intermediate value calculator 62 is reduced to ½, the gain of the gain adjuster 19 is changed to −1 dB. Although the output of the intermediate value calculator 62 has a different phase and a different amplitude from that of the color signal component of the video signal 100, since the output can be used as a color signal as it is, the video signal processor may dispense with the gain adjuster 19.

The range of application of each element in each of these embodiments will now be explained. The phase matching circuit 12 is an amplifier for shifting the phase by 180 degrees so as to match the phases of the first to third signal 101 to 103, as described above. Since the color signal delayed by 1H has an inverted phase, at least this function is necessary. However, it is said that the critical phase difference detectable with human eyes is as small as 2 degrees. Therefore, the 1H-delay circuits 7, 11, the BPF's 9, 13, etc. may have respective functions of matching the phases of the three signals. Alternatively, the BPF 9 may also have the function of matching phases. Further the 1H-delay circuit 11 for matching the phase of the third signal 103 may also have the function of inverting the phase. Furthermore, in the third and fourth embodiments, it is possible to unite the phase matching circuit 12 and the double amplifier 17 into one body, as an amplifier having a gain of −2 dB.

The 1H-delay circuits 7 and 11, which are required for generating the second and third signals 102 and 103, may be effectively utilized for delaying signals by any other time. For example, in the PAL system, in which the phases of a color burst signal and a color signal are inverted for every 2H's, a YC separating circuit of the PAL system can be realized by using 2H-delay circuits in place of the 1H-delay circuits 7 and 11. Furthermore, in the NTSC system, in which the phases of a color burst signal and a color signal are inverted in every frame, a YC circuit may also be realized by using 525H-delay circuits in place of the 1H-delay circuits 7 and 11. It is also possible to realize a digital YC separating circuit by using delay circuits having a memory as these delay circuits, digital computers as the adders and the calculators, and digital signals as the signals.

The BPF's 9 and 13 are filters for transmitting a color signal, as explained in the related art. The BPF's 9 and 13 in the present invention are used so as to suppress a lower frequency band which is unnecessary for calculating an intermediate value of higher frequency band components of a color signal or a luminance signal by the nonlinear filters 14, 47 and 57. For example, if it is assumed that the BPF's 9 and 13 transmit a direct current, the nonlinear filters 14, 47 and 57 calculate an intermediate value including the direct current, so that it is impossible to calculate an intermediate value of higher frequency components of a color signal or a luminance signal and, hence, to output a desired color signal or unrelated luminance signal. In order to cancel the direct current, the band of frequencies which the BPF's 9 and 13 transmit is not limited to 3.58 MH$_z$±500 KH$_z$ and may be broader. For example, the BPF's 9 and 13 may be high-pass filters for transmitting frequencies of not less than 2 MH$_z$.

As described above, the main outputs obtained by processing signals in the above-described embodiments are color signals or unrelated luminance signals with the lower frequency band suppressed which are obtained from the outputs of the nonlinear filters 14, 47 and 57. If only these signals are desired, the auxiliary delay circuit 8 and subtractor 10 for obtaining a Y signal are unnecessary. For example, the nonlinear filter 14, 47 and 57 may be utilized as a filter for cancelling the crosstalk component in a color signal, thereby eliminating the phenomenon of color edging, as explained in the related art.

These embodiments have the following effects as well as the above-described fundamental effects. In the first to fourth embodiments, signals are nonlinearly processed in the circuits shown in FIGS. 3(a) and 3(b) so as to obtain a color signal. For the purpose of switching, an input of not less than 100 mVp-p is necessary. If the input is as small as about 20 mVp-p, the output becomes the sum of the inputs 101, 102 and 103 and an adequate color signal separating operation is not expected. If such nonlinear processing is carried out in series at multi-stages, such conveniences are multiplied. In these embodiments, however, since the nonlinear processing is carried out at a single stage, the inconvenience is limited to the minimum and the input amplitude is also limited to the minimum.

In the switching circuits shown in FIG. 3(a) and 3(b), the delay time is in the order of 10 ns. This is 13 degrees in terms of the phase of a color signal, which greatly exceeds the critical phase difference detectable with human eyes Therefore, in the system in which a signal which passes the switching circuit and a signal which does not pass the switching circuit are compounded, a delay compensating circuit for matching the delay times of these signals is required. In the third and fourth embodiments, however, since the adder 55 compounds the outputs of the switching circuits, there is no color edging and no delay compensation is required, thereby enabling reduction in cost.

In the fifth and sixth embodiments, addition and subtraction of signals for obtaining a color signal is carried out at the stage preceding to the intermediate value calculator 62, and no addition or subtraction is carried out between the signal which passes the intermediate value calculator 62 and a signal which does not pass the intermediate value calculator 62. If the latter addition or subtraction is carried out, the switching circuit shown in FIG. 12 causes delay in the order of 10 ns, so that a delay compensating circuit for matching the delay times before the addition or subtraction is necessary. That is, since 10 ns is about 13 degrees in terms of the phase of a color signal, which greatly exceeds the critical phase detectable by human eyes, thereby necessitating compensation for the delay. In these embodiments, however, such addition or subtraction is not carried out, so that compensation for the delay to the intermediate value calculator 62 is unnecessary. Thus, there is no deviation of the phase of a color signal, and it is possible to separate a color signal at a low cost.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A video signal processor for use in a television set for processing a video signal, input in horizontal line periods, said video signal processor comprising:

first and second delay circuits, said first delay circuit for delaying said video signal input thereto by a horizontal line period and said second delay circuit for further delaying said delayed input video signal by a second horizontal line period so as to produce a first delay signal and a second delay signal, respectively;

signal processing means for receiving said input video signal, a modified version of said first delay signal and said second delay signal and for producing and outputting a separated signal component of the input video signal, the signal processing means including, a maximum value calculator for receiving and comparing said input video signal, the modified version of said first delay signal and said second delay signal and for outputting a maximum value, a minimum value calculator for receiving and comparing said input video signal, the modified version of said first delay signal, and said second delay signal and for outputting a minimum value, and a synthesizer for subtracting the outputs from said maximum value calculator and said minimum value calculator from the sum of said input video signal, the modified version of the first delay signal and the second delay signal and for outputting the separated signal component;

phase shifting means for shifting a phase of said first delay signal to a phase of the separated signal component output from the signal processing means; and a separator for removing the separated signal component output from the signal processing means from said phase shifted first delay signal to remove the separated signal component from the input video signal.

2. The video signal processor of claim 1, wherein said first delay circuit and said second delay circuit are connected in series, said first delay circuit outputting said first delay signal, and said second delay circuit outputting said second delay signal.

3. The video signal processor of claim 1, further comprising a filtering means for substantially passing predetermined frequency bands of said input video signal and said first delay signal.

4. The video signal processor of claim 3, wherein said filtering means includes, a first filter for passing a predetermined frequency band of said input video signal prior to input to said signal processing means; and a second filter for passing a predetermined frequency band of said first delay signal.

5. The video signal processor of claim 1, further comprising:

phase inverting means for inverting the phase of said first delay signal prior to input to said signal processing means; and an amplitude adjusting means for adjusting the amplitude of said phase inverted first delay signal prior to input to said synthesizer.

6. The video signal processor of claim 5, wherein said phase shifting means is a third delay circuit for delaying said first delay signal, and said amplitude adjusting means is a gain adjuster for multiplying said phase inverted first delay signal by 2.

7. The video signal processor of claim 1, further comprising phase inverting means for inverting the phase of the separated signal component output from the synthesizer, prior to input to the separator.

8. The video signal processor of claim 1, wherein said input video signal includes a color signal and a luminance signal, said separated signal component output from said synthesizer is a color signal, and an output of said separator is a luminance signal.

9. The video signal processor of claim 1, wherein said input video signal is a luminance signal, said separated signal component output from said synthesizer is a noise component, and said separator separates said noise component from said luminance signal.

* * * * *